(12) United States Patent
Holzer et al.

(10) Patent No.: US 11,776,142 B2
(45) Date of Patent: Oct. 3, 2023

(54) STRUCTURING VISUAL DATA

(71) Applicant: Fyusion, Inc., San Francisco, CA (US)

(72) Inventors: Stefan Johannes Josef Holzer, San Mateo, CA (US); Matteo Munaro, San Francisco, CA (US); Radu Bogdan Rusu, San Francisco, CA (US)

(73) Assignee: Fyusion, Inc., San Francisco, CA (US)

( * ) Notice: Subject to any disclaimer, the term of this patent is extended or adjusted under 35 U.S.C. 154(b) by 456 days.

(21) Appl. No.: 17/144,831

(22) Filed: Jan. 8, 2021

(65) Prior Publication Data

US 2021/0225017 A1 Jul. 22, 2021

Related U.S. Application Data

(60) Provisional application No. 62/961,810, filed on Jan. 16, 2020.

(51) Int. Cl.
*G06T 7/38* (2017.01)
*G06N 3/04* (2023.01)
(Continued)

(52) U.S. Cl.
CPC ............ *G06T 7/38* (2017.01); *G06N 3/04* (2013.01); *G06T 7/33* (2017.01); *G06T 7/97* (2017.01);
(Continued)

(58) Field of Classification Search
CPC .... G06T 7/38; G06T 7/33; G06T 7/97; G06T 15/205; G06T 17/20; G06T 19/006;
(Continued)

(56) References Cited

U.S. PATENT DOCUMENTS

| 5,764,306 A | 6/1998 | Steffano |
| 5,923,380 A | 7/1999 | Yang |

(Continued)

FOREIGN PATENT DOCUMENTS

| GB | 2573170 A | 10/2019 |
| WO | 2016064921 A1 | 4/2016 |

(Continued)

OTHER PUBLICATIONS

Office Action (Notice of Allowance and Fees Due (PTOL-85)) dated Sep. 15, 2021 for U.S. Appl. No. 16/518,570 (pp. 1-8).

(Continued)

*Primary Examiner* — Christopher M Brandt
(74) *Attorney, Agent, or Firm* — Kwan & Olynick LLP

(57) ABSTRACT

Mappings are determined between viewpoints of an object and an object model representing the object. Each mapping identifies a location on the object model corresponding with a portion of the object captured in one of the viewpoints. Tags for the object model are created based on the mappings, where each tag links one of the viewpoints to one of the locations on the object model. A user interface that includes the object model and the tags is provided for presentation on a display screen in a user interface. One of the viewpoints is presented in the user interface when the corresponding tag is selected in the object model.

20 Claims, 23 Drawing Sheets
(7 of 23 Drawing Sheet(s) Filed in Color)

(51) Int. Cl.
    *G06T 19/00* (2011.01)
    *G06T 17/20* (2006.01)
    *G06T 7/33* (2017.01)
    *G06T 7/00* (2017.01)
    *G06T 15/20* (2011.01)
    *H04N 23/60* (2023.01)

(52) U.S. Cl.
    CPC ............ *G06T 15/205* (2013.01); *G06T 17/20* (2013.01); *G06T 19/006* (2013.01); *H04N 23/64* (2023.01); *G06T 2219/004* (2013.01)

(58) Field of Classification Search
    CPC ........... G06T 2219/004; G06T 2200/08; G06T 2200/24; G06T 2207/10016; G06T 2207/30244; G06T 7/75; G06T 19/003; G06T 15/20; G06N 3/04; G06N 3/08; H04N 23/64; G06F 3/011
    See application file for complete search history.

(56) References Cited

U.S. PATENT DOCUMENTS

| | | | |
|---|---|---|---|
| 6,067,369 A | 5/2000 | Kamei |
| 6,453,069 B1 | 9/2002 | Matsugu |
| 6,788,309 B1 | 9/2004 | Swan |
| 6,879,956 B1 | 4/2005 | Honda |
| 6,912,313 B2 | 6/2005 | Li |
| 7,249,019 B2 | 7/2007 | Culy |
| 7,292,257 B2 | 11/2007 | Kang |
| 7,565,004 B2 | 7/2009 | Hashimoto |
| 7,949,529 B2 | 5/2011 | Weider |
| 9,182,229 B2 | 11/2015 | Gräßer |
| 9,218,698 B2 | 12/2015 | Ricci |
| 9,467,750 B2 | 10/2016 | Banica |
| 9,495,764 B1 | 11/2016 | Boardman |
| 9,886,636 B2 | 2/2018 | Zhang |
| 9,886,771 B1 | 2/2018 | Chen |
| 10,319,094 B1 | 6/2019 | Chen |
| 10,373,387 B1 | 8/2019 | Fields |
| 10,573,012 B1 | 2/2020 | Collins |
| 10,636,148 B1 | 4/2020 | Chen |
| 10,657,647 B1 | 5/2020 | Chen |
| 10,698,558 B2 | 6/2020 | Holzer |
| 10,893,213 B2 | 1/2021 | Magnuszewski |
| 11,004,188 B2 | 5/2021 | Holzer |
| 2002/0063714 A1 | 5/2002 | Haas |
| 2002/0198713 A1 | 12/2002 | Franz |
| 2004/0258306 A1 | 12/2004 | Hashimoto |
| 2007/0253618 A1 | 11/2007 | Kim |
| 2008/0101656 A1 | 5/2008 | Barnes |
| 2008/0180436 A1 | 7/2008 | Kraver |
| 2009/0289957 A1 | 11/2009 | Sroka |
| 2010/0111370 A1 | 5/2010 | Black |
| 2010/0251101 A1 | 9/2010 | Haussecker |
| 2011/0218825 A1 | 9/2011 | Hertenstein |
| 2013/0297353 A1 | 11/2013 | Strange |
| 2014/0119604 A1 | 5/2014 | Mai |
| 2014/0172245 A1 | 6/2014 | Soles |
| 2015/0029304 A1 | 1/2015 | Park |
| 2015/0097931 A1 | 4/2015 | Hatzilias |
| 2015/0103170 A1 | 4/2015 | Nelson |
| 2015/0125049 A1 | 5/2015 | Taigman |
| 2015/0278987 A1 | 10/2015 | Mihara |
| 2015/0317527 A1 | 11/2015 | Graumann |
| 2015/0347845 A1 | 12/2015 | Benson |
| 2015/0365661 A1 | 12/2015 | Hayashi |
| 2016/0035096 A1 | 2/2016 | Rudow |
| 2017/0109930 A1 | 4/2017 | Holzer |
| 2017/0199647 A1 | 7/2017 | Richman |
| 2017/0208246 A1 | 7/2017 | Kimura |
| 2017/0277363 A1 | 9/2017 | Holzer |
| 2017/0293894 A1 | 10/2017 | Taliwal |
| 2018/0027178 A1 | 1/2018 | MacMillan |
| 2018/0160102 A1 | 6/2018 | Luo |
| 2018/0190017 A1 | 7/2018 | Mendez |
| 2018/0225858 A1 | 8/2018 | Ni |
| 2018/0255290 A1 | 9/2018 | Holzer |
| 2018/0260793 A1 | 9/2018 | Li |
| 2018/0293552 A1 | 10/2018 | Zhang |
| 2018/0315260 A1 | 11/2018 | Anthony |
| 2018/0322623 A1 | 11/2018 | Memo |
| 2018/0338126 A1 | 11/2018 | Trevor |
| 2018/0349746 A1 | 12/2018 | Vallespi-Gonzalez |
| 2019/0012394 A1 | 1/2019 | Endras |
| 2019/0035165 A1 | 1/2019 | Gausebeck |
| 2019/0066304 A1 | 2/2019 | Hirano |
| 2019/0073641 A1 | 3/2019 | Utke |
| 2019/0098277 A1 | 3/2019 | Takama |
| 2019/0116322 A1 | 4/2019 | Holzer |
| 2019/0147221 A1 | 5/2019 | Grabner |
| 2019/0147583 A1 | 5/2019 | Stefan |
| 2019/0164301 A1 | 5/2019 | Kim |
| 2019/0189007 A1 | 6/2019 | Herman |
| 2019/0196698 A1 | 6/2019 | Cohen |
| 2019/0197196 A1 | 6/2019 | Yang |
| 2019/0205086 A1 | 7/2019 | McNulty |
| 2019/0317519 A1 | 10/2019 | Chen |
| 2019/0318759 A1 | 10/2019 | Doshi |
| 2019/0335156 A1 | 10/2019 | Rusu |
| 2019/0349571 A1 | 11/2019 | Herman |
| 2019/0392569 A1 | 12/2019 | Finch |
| 2020/0111201 A1 | 4/2020 | Kuruvilla |
| 2020/0118342 A1 | 4/2020 | Varshney |
| 2020/0151860 A1 | 5/2020 | Safdarnejad |
| 2020/0193675 A1 | 6/2020 | Burnett, III |
| 2020/0231286 A1 | 7/2020 | Movsesian |
| 2020/0233892 A1 | 7/2020 | Calhoun |
| 2020/0234397 A1 | 7/2020 | Holzer |
| 2020/0234398 A1 | 7/2020 | Holzer |
| 2020/0234424 A1 | 7/2020 | Holzer |
| 2020/0234451 A1 | 7/2020 | Holzer |
| 2020/0234488 A1 | 7/2020 | Holzer |
| 2020/0236296 A1 | 7/2020 | Holzer |
| 2020/0236343 A1 | 7/2020 | Holzer |
| 2020/0257862 A1 | 8/2020 | Kar |
| 2020/0258309 A1 | 8/2020 | Holzer |
| 2020/0312028 A1 | 10/2020 | Charvat |
| 2020/0322546 A1 | 10/2020 | Carolus |
| 2020/0349757 A1 | 11/2020 | Holzer |
| 2022/0335681 A1* | 10/2022 | Horikawa ............... G06V 20/60 |

FOREIGN PATENT DOCUMENTS

| | | |
|---|---|---|
| WO | 2017115149 A1 | 7/2017 |
| WO | 2017195228 A1 | 11/2017 |
| WO | 2019186545 | 10/2019 |
| WO | 2019229912 | 12/2019 |
| WO | 2020009948 A1 | 1/2020 |
| WO | 2020125726 | 6/2020 |
| WO | 2020154096 A1 | 7/2020 |

OTHER PUBLICATIONS

Office Action dated Jul. 16, 2021 for U.S. Appl. No. 16/518,501 (pp. 1-23).

Office Action dated Jul. 26, 2021 for U.S. Appl. No. 16/518,558 (pp. 1-17).

Office Action dated Jun. 14, 2021 for U.S. Appl. No. 16/518,570 (pp. 1-24).

Office Action dated May 18, 2021 for U.S. Appl. No. 16/692,219 (pp. 1-13).

Riza Alp Guler et al., "DensePose: Dense Human Pose Estimation in The Wild", arXiv:1802.00434v1 [cs.CV] Feb. 1, 2018, 12 pages.

Shubham Tulsiani and Jitendra Malik, "Viewpoints and Keypoints", arXiv:1411.6067v2 [cs.CV] Apr. 26, 2015, 10 pages.

Wenhao Lu, et al., "Parsing Semantic Parts of Cars Using Graphical Models and Segment Appearance Consistency", arXiv:1406 2375v2 [cs CV] Jun. 11, 2014, 12 pages.

Alberto Chavez-Aragon, et al., "Vision-Based Detection and Labelling of Multiple Vehicle Parts", 2011 14th International IEEE

(56) References Cited

OTHER PUBLICATIONS

Conference on Intelligent Transportation Systems Washington, DC, USA. Oct. 5-7, 2011, 6 pages.
U.S. Appl. No. 16/518,501, CTFR—Final Rejection, dated Dec. 9, 2020, 16 pgs.
U.S. Appl. No. 16/518,501, Examiner Interview Summary Record (Ptol-413), dated Nov. 23, 2020, 2 pgs.
U.S. Appl. No. 16/518,501, Non-Final Rejection, Sep. 1, 2020, dated 15 pgs.
U.S. Appl. No. 16/518,512, Examiner Interview Summary Record (Ptol-413), Nov. 19, 2020, 3 pgs.
U.S. Appl. No. 16/518,512, Non-Final Rejection, dated Oct. 1, 2020, 24 pgs.
U.S. Appl. No. 16/518,512, Office Action Appendix, dated Nov. 19, 2020, 1 pg.
U.S. Appl. No. 16/518,558, Non-Final Rejection, dated Sep. 8, 2020, 14 pgs.
U.S. Appl. No. 16/518,585, Non-Final Rejection, dated Sep. 3, 2020, 13 pgs.
U.S. Appl. No. 16/596,516, Non-Final Rejection, dated Jun. 23, 2020, 37 pgs.
U.S. Appl. No. 16/596,516, Notice of Allowance and Fees Due (Ptol-85), dated Sep. 21, 2020, 10 pgs.
U.S. Appl. No. 16/692,133, Non-Final Rejection, dated Jul. 24, 2020, 17 pgs.
U.S. Appl. No. 16/692,170, Non-Final Rejection, dated Nov. 20, 2020, 13 pgs.
U.S. Appl. No. 16/692,219, Non-Final Rejection, dated Dec. 8, 2020, 9 pgs.
U.S. Appl. No. 16/861,100, Non-Final Rejection, dated Oct. 8, 2020, 11 pgs.
U.S. Appl. No. 16/518,512, Notice of Allowance dated Jan. 25, 2021, 7 pgs.
U.S. Appl. No. 16/518,512, Notice of Allowance dated Dec. 16, 2020, 9 pgs.
U.S. Appl. No. 16/518,558, Examiner Interview Summary dated Dec. 16, 2020, 1 pg.
U.S. Appl. No. 16/518,558, Final Office Action dated Dec. 16, 2020, 16 pgs.
U.S. Appl. No. 16/518,570, Non-Final Office Action dated Jan. 6, 2021, 17 pgs.
U.S. Appl. No. 16/518,585, Notice of Allowance dated Dec. 14, 2020, 5 pgs.
U.S. Appl. No. 16/692,133, Notice of Allowance dated Dec. 15, 2020, 7 pgs.
U.S. Appl. No. 16/692,170, Notice of Allowance dated Feb. 9, 2021, 8 pgs.
U.S. Appl. No. 16/861,100, Advisory Action dated Jun. 10, 2021, 3 pgs.
U.S. Appl. No. 16/861,100, Examiner Interview Summary dated Feb. 10, 2021, 2 pgs.
U.S. Appl. No. 16/861,100, Examiner Interview Summary dated Jun. 10, 2021, 1 pg.
U.S. Appl. No. 16/861,100, Examiner Interview Summary dated Jun. 3, 2021, 2 pgs.
U.S. Appl. No. 16/861,100, Final Office Action dated Feb. 26, 2021, 15 pgs.
Gerd Lindner et al., "Structure-Preserving Sparsification of Social Networks", arXiv:1505.00564vl [cs.SI] May 4, 2015, 8 pages.
Int'l Application Serial No. PCT/US20/12592, Int'l Search Report and Written Opinion dated Apr. 21, 2020. 9 pages.
International Search Report and Written Opinion for App. No. PCT/US2021/013471, dated May 6, 2021, 10 pages.
International Search Report and Written Opinion for App. No. PCT/US2021/013472, dated May 11, 2021, 10 pages.
Jeff Donahue et al., "DeCAF: ADeep Convolutional Activation Feature for Generic Visual Recognition", arXiv: 1310.153vl [cs.CV] Oct. 6, 2013, 10 pages.
Office Action (Final Rejection) dated Jan. 19, 2022 for U.S. Appl. No. 16/861,097 (pp. 1-16).
Office Action (Final Rejection) dated Jan. 19, 2022 for U.S. Appl. No. 16/861,100 (pp. 1-19).
Office Action (Final Rejection) dated Jan. 20, 2022 for U.S. Appl. No. 17/215,596 (pp. 1-16).
Office Action (Final Rejection) dated Mar. 3, 2022 for U.S. Appl. No. 17/174,250 (pp. 1-24).
Office Action (Final Rejection) dated Apr. 19, 2022 for U.S. Appl. No. 16/692,219 (pp. 1-13).
Office Action (Final Rejection) dated Nov. 9, 2021 for U.S. Appl. No. 16/518,558 (pp. 1-17).
Office Action (Final Rejection) dated Dec. 7, 2021 for U.S. Appl. No. 16/518,501 (pp. 1-21).
Office Action (Final Rejection) dated Jun. 14, 2021 for U.S. Appl. No. 16/518,570 (pp. 1-23).
Office Action (Non-Final Rejection) dated Mar. 28, 2022 for U.S. Appl. No. 16/518,501 (pp. 1-21).
Office Action (Non-Final Rejection) dated Mar. 29, 2022 for U.S. Appl. No. 16/518,558 (pp. 1-16).
Office Action (Non-Final Rejection) dated Apr. 14, 2022 for U.S. Appl. No. 17/144,879 (pp. 1-12).
Office Action (Non-Final Rejection) dated Sep. 2, 2021 for U.S. Appl. No. 17/174,250 (pp. 1-22).
Office Action (Non-Final Rejection) dated Sep. 20, 2021 for U.S. Appl. No. 16/861,100 (pp. 1-19).
Office Action (Non-Final Rejection) dated Sep. 24, 2021 for U.S. Appl. No. 17/215,596 (pp. 1-14).
Office Action (Non-Final Rejection) dated Oct. 4, 2021 for U.S. Appl. No. 16/861,097 (pp. 1-15).
Office Action (Non-Final Rejection) dated Dec. 7, 2021 for U.S. Appl. No. 16/692,219 (pp. 1-12).
Office Action (Notice of Allowance and Fees Due (PTOL-85)) dated Apr. 7, 2022 for U.S. Appl. No. 17/215,596 (pp. 1-9).
Office Action (Non-Final Rejection) dated Jun. 15, 2022 for U.S. Appl. No. 16/861,097 (pp. 1-17).
Office Action (Non-Final Rejection) dated Jun. 15, 2022 for U.S. Appl. No. 16/861,100 (pp. 1-18).
Office Action (Non-Final Rejection) dated Jul. 22, 2022 for U.S. Appl. No. 17/351,124 (pp. 1-12).
Office Action dated Jun. 15, 2022 for U.S. Appl. No. 17/190,268 (pp. 1-17).
International Search Report and Written Opinion for App. No. PCT/US2021/013431, dated May 6, 2021, 10 pages.
Dorfler Martin et al, "Application of Surface Reconstruction for Car Undercarriage Inspection", 2020 3rd International Conference on Intelligent Robotic and Control Engineering (IRCE), IEEE, (Aug. 10, 2020), doi: 10.1109/IRCE50905.2020.9199251, pp. 47-51, XP033828019 Abstract Only.
Giegerich, et al., "Automated Classification of "Bad Images" by Means of Machine Learning for Improved Analysis of Vehicle Undercarriages," TechConnect Briefs 2022, pp. 1-4.
Green, et al., "Vehicle Underscarriage Scanning for use in Crash Reconstruction," FARO White Paper, 2015, 5 pages.
IVUS Intelligent Vehicle Undercarriage Scanner Brochusre, GatekeeperSecurity.com, 2 pages.
Kiong, Frederick Chong Chuen, "Vehicle Undercarriage Scanning System," A disseration for ENG 4111 and ENG 4112 Research Project, University of Southern Queensland (USQ), Oct. 27, 2005, 163 pages.
Office Action (Final Rejection) dated Jan. 31, 2023 for U.S. Appl. No. 17/351,124 (pp. 1-14).
Office Action (Final Rejection) dated Aug. 31, 2022 for U.S. Appl. No. 17/144,879 (pp. 1-14).
Office Action (Final Rejection) dated Nov. 14, 2022 for U.S. Appl. No. 16/861,097 (pp. 1-19).
Office Action (Final Rejection) dated Nov. 14, 2022 for U.S. Appl. No. 16/861,100 (pp. 1-19).
Office Action (Non-Final Rejection) dated Jan. 6, 2023 for U.S. Appl. No. 17/144,879 (pp. 1-14).
Office Action (Non-Final Rejection) dated Jan. 13, 2023 for U.S. Appl. No. 16/518,501 (pp. 1-21).
Office Action (Non-Final Rejection) dated Jan. 18, 2023 for U.S. Appl. No. 16/518,558 (pp. 1-16).

(56) References Cited

OTHER PUBLICATIONS

Office Action (Non-Final Rejection) dated Mar. 16, 2023 for U.S. Appl. No. 16/937,884 (pp. 1-30).
Office Action (Non-Final Rejection) dated Sep. 16, 2022 for U.S. Appl. No. 16/937,884 (pp. 1-29).
Office Action (Non-Final Rejection) dated Dec. 22, 2022 for U.S. Appl. No. 17/502,579 (pp. 1-20).
Office Action (Notice of Allowance and Fees Due (PTOL-85)) dated Feb. 13, 2023 for U.S. Appl. No. 17/190,268 (pp. 1-4).
Office Action (Notice of Allowance and Fees Due (PTOL-85)) dated Apr. 4, 2023 for U.S. Appl. No. 17/174,250 (pp. 1-8).
Office Action (Notice of Allowance and Fees Due (PTOL-85)) dated May 1, 2023 for U.S. Appl. No. 17/502,579 (pp. 1-8).
Office Action (Notice of Allowance and Fees Due (PTOL-85)) dated Sep. 19, 2022 for U.S. Appl. No. 17/144,885 (pp. 1-7).
Office Action (Notice of Allowance and Fees Due (PTOL-85)) dated Nov. 15, 2022 for U.S. Appl. No. 17/190,268 (pp. 1-7).
Office Action (Notice of Allowance and Fees Due (PTOL-85)) dated Dec. 19, 2022 for U.S. Appl. No. 17/190,268 (pp. 1-4).
Robert Ross et al, "Mobile robot mosaic imaging of vehicle undercarriages using catadioptric vision", Control, Automation and Information Sciences (ICCAIS), 2012 International Conference on, IEEE, (Nov. 26, 2012), doi:10.1109/ICCAIS.2012.6466596, ISBN 978-1-4673-0812-0, pp. 247-252, XP032335072 Abstract Only.
S. R. Sukumar et al, "Under Vehicle Inspection with 3d Imaging", 3D Imaging for Safety and Security, Dordrecht, Springer Netherlands, (Jan. 1, 2007), vol. 35, pp. 249-278, doi:10.1007/978-1-4020-6182-0_11, ISBN 978-1-4020-6181-3, XP055518511.
Zhou, X. Q., H. K. Huang, and Shieh-Liang Lou. "Authenticity and integrity of digital mammography images." IEEE transactions on medical imaging 20.8 (2001): 784-791 (Year: 2001).
Extended European Search Report issued in App. No. EP20744281.5, dated Aug. 12, 2022, 7 pages.
Office Action (Final Rejection) dated Aug. 12, 2022 for U.S. Appl. No. 16/518,501 (pp. 1-21).
Office Action (Final Rejection) dated Aug. 12, 2022 for U.S. Appl. No. 16/518,558 (pp. 1-18).
Office Action (Non-Final Rejection) dated Aug. 18, 2022 for U.S. Appl. No. 17/174,250 (pp. 1-17).
Office Action (Notice of Allowance and Fees Due (PTOL-85)) dated Aug. 17, 2022 for U.S. Appl. No. 16/692,219 (pp. 1-7).

\* cited by examiner

STRUCTURING VISUAL DATA

PRIORITY CLAIM

The present application claims priority under 35 U.S.C. 120 to U.S. Patent App. No. 62/961,810, titled "Structuring Visual Data", filed Jan. 16, 2020 by Holzer, which is hereby incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

The present disclosure relates generally to the processing of visual digital media content, and more specifically to the structuring of visual data.

DESCRIPTION OF RELATED ART

Visual data encompasses a wide variety of information, such as individual images, video, and multi-view captures. Images and multi-view captures are useful and informative tools for presenting information about objects. However, visual data is often capture in a format that leaves it effectively unstructured. For example, someone may capture multiple images and/or videos of the same object in a relatively random fashion. Processing such data to determine, for instance, whether the object has been damaged or whether all parts of the object have been captured may involve considerable manual effort in which a human must make many decisions about how to organize and sort the visual information.

OVERVIEW

Provided are various mechanisms and processes relating to the processing of visual media data. According to various embodiments, techniques and mechanisms described herein may facilitate structuring visual data.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The included drawings are for illustrative purposes and serve only to provide examples of possible structures and operations for the disclosed inventive systems, apparatus, methods and computer program products for processing visual data. These drawings in no way limit any changes in form and detail that may be made by one skilled in the art without departing from the spirit and scope of the disclosed implementations.

DETAILED DESCRIPTION

Figure 1:
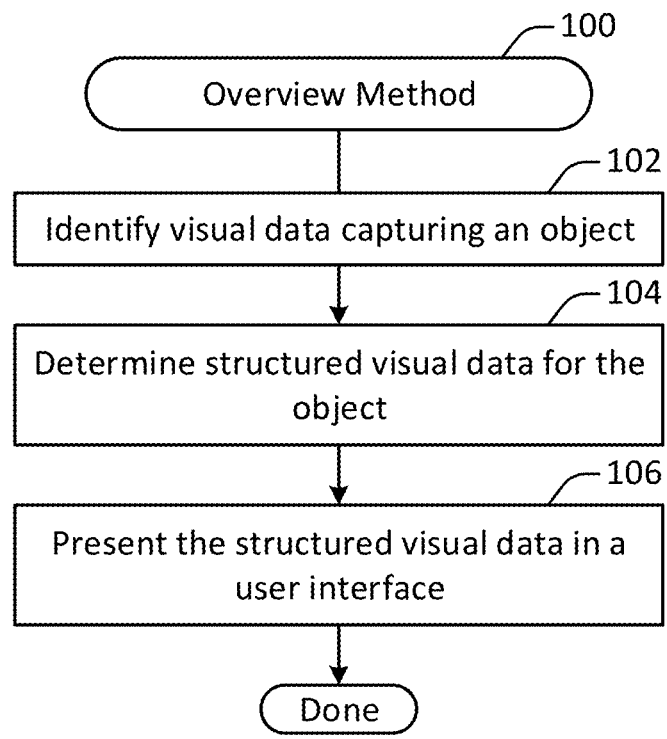
FIG. 1 illustrates one example of an overview method, performed in accordance with one or more embodiments.

According to various embodiments, techniques and mechanisms described herein may be used to structure visual data about an object. Visual data such as one or more images, videos, and/or multi-view captures of an object may be determined. That visual data may then be analyzed to determine a structure for the visual data. The structured visual data may then be presented in a systematic way, such as in a user interface in which visual data is accessed via tags located on a standard (e.g., top-down) view of an object.

In some implementations, a user may be guided to capture more comprehensive visual data of the object. For example, the visual data may be analyzed to determine whether each of a set of components of the object have been captured. If the coverage of one or more components in the visual data is determined to be inadequate, then the user may be guided to capture visual data of that component.

Visual data such as videos or images is often captured in such a way that the data is effectively unstructured. For example, consider an individual is tasked with capturing photos and/or video to support an insurance claim. A large amount of visual data is often captured in such situations. The visual data may include, for instance, hundreds of images and several videos. Typically, the visual data will be captured in a relatively random order. Accordingly, a claims processor may have to expend considerable time and effort to sort through the visual data and make sense of it. For instance, the claims processor may need to identify multiple photos or videos that cover the same area of the vehicle, and then associate that visual data together to get a better sense of the type and severity of the damage. When analyzing video data, the claim processor may need to go through the entire video to determine which parts of it are relevant, and may lack a good way to highlight those parts.

Keeping with the same example, the labor involved may increase even more when the claims processor needs to determine whether all components of the vehicle have been suitable captured, and must further specify additional visual data for capture. All of this labor can lead to a lengthy process time for insurance claims, and potentially increase back-and-forth communication between the claim processor and the claimant until the claim processor is equipped with the necessary visual data.

Moreover, multiple data sets of photos of the same vehicle may be captured at different points in time. In such a situation, the claim processor may want to look at both data sets and compare the state of the vehicle, for instance before and after an occurrence.

According to one or more embodiments described herein, the visual data described above may be automatically analyzed and structured. For instance, each element within the visual data associated with an insurance claim may be analyzed to identify the component or component of the vehicle captured in the element. The element may then be associated with that component in a standard view of the object. The claim adjuster may then be presented with the standard view, allowing her to quickly assess the information. Accordingly, techniques and mechanisms described herein may save substantial time on the part of the human analyst.

In some implementations, the visual data described above may be automatically analyzed for completeness. For instance, an individual capturing insurance claim data may be notified when coverage of the vehicle in the image data is incomplete. Then, the individual may be guided to capture coverage of one or more components of the vehicle where the existing coverage is deemed insufficient.

According to various embodiments, for illustrative purposes one or more examples are described herein with reference to vehicles and automotive contexts. However, techniques and mechanisms described herein are generally applicable to a wide range of contexts. For instance, techniques and mechanisms described herein may be applied to visual data of a variety of objects, such as articles of clothing, persons, animals, and buildings.

FIG. 1 illustrates one example of an overview method 100, performed in accordance with one or more embodiments. According to various embodiments, the method may be performed at any suitable computing device, such as a server, a client machine, or a server in communication with a client machine. A client machine may include one or more devices such as a laptop, a personal computer, or a smartphone.

Visual data capturing an object is identified at 102. In some implementations, the visual data may include one or more images, videos, and/or multi-view captures. Additional details regarding multi-view captures are described throughout the application, such as with respect to FIGS. 5-18. The visual data may be identified, for instance, based on user input identifying visual data to analyze. Alternately, or additionally, visual data may be automatically analyzed, for instance when received within an insurance claim processing system.

In some implementations, the visual data may be predetermined. For example, an individual may capture visual data of an object and then submit the data to an insurance claim processing system.

Figure 2:
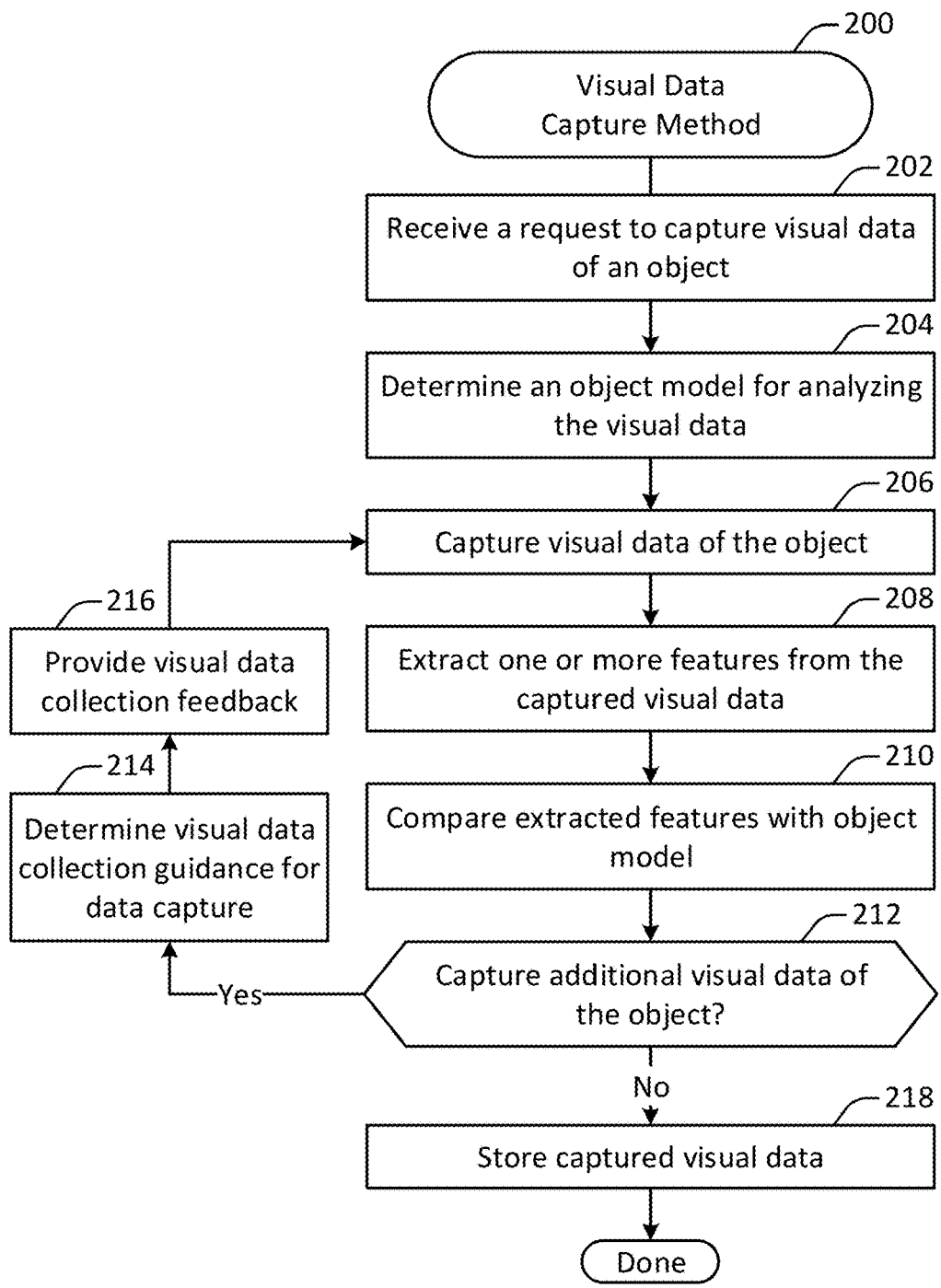
FIG. 2 illustrates a method for capturing visual data, performed in accordance with one or more embodiments.

In some embodiments, the visual data may be captured during the performance of the method 100. For instance, the visual data may be captured and analyzed on a smartphone having one or more cameras. The method 200 shown in FIG. 2 provides additional details regarding the guided capture of image data.

Structured visual data for the object is determined at 104. In some implementations, determining structured visual data may involve one or more operations such as object or component recognition, object or component tagging, and/or pixel mapping between a perspective view image and a standard view of the object. Additional details regarding the determination of structured visual data are described with respect to the method 300 shown in FIG. 3.

In some embodiments, the structured visual data is presented in a user interface. According to various embodiments, presenting the structured visual data in a user interface may involve providing the data to an application implemented on a computing device such as a laptop computer, a desktop computer, a smartphone, or another suitable electronic device. The application may be a native application or a web-based application.

In some embodiments, a document including the structured visual data in a standardized format, such as the Portable Document Format (PDF), may be generated. Additional details regarding the presentation of structured visual are described with respect to the method 400 shown in FIG. 4.

FIG. 2 illustrates a method 200 for capturing visual data, performed in accordance with one or more embodiments. According to various embodiments, the method 200 may be performed on any suitable computing device equipped with one or more cameras. For instance, the method 200 may be performed on a smartphone. The smart phone may be in communication with a remote server. The method 200 may be used to capture visual data of any of various types of objects. However, for the purpose of illustration, one or more examples are discussed with reference to vehicles.

A request to capture visual data of an object is received at 202. In some implementations, the request to capture input data may be received at a mobile computing device such as a smart phone. In particular embodiments, the object may be a vehicle such as a car, truck, or sports utility vehicle.

An object model for visual data analysis is determined at 204. According to various embodiments, the object model may include reference data for the object. For example, the object model may include one or more reference images of similar objects for comparison. As another example, the object model may include a trained neural network. As yet another example, the object model may include one or more reference images of the same object captured at an earlier point in time. As yet another example, the object model may include a 2D model (such as a CAD model) or a 2D mesh reconstruction of the object.

In some embodiments, the object model may be determined based on user input. For example, the user may identify a vehicle in general or a car, truck, or sports utility vehicle in particular as the object type.

In some implementations, the object model may be determined automatically based on data captured as part of the method 200. In this case, the object model may be determined after the capturing visual data at 206.

At 206, visual data of the object is captured. According to various embodiments, the visual data may include one or more images, videos, and/or multi-view captures. For instance, a user may guide a smartphone to capture image of an object such as a vehicle or person.

In some embodiments, data may be received from one or more of various sensors. Such sensors may include, but are not limited to, one or more cameras, depth sensors, accelerometers, and/or gyroscopes. The sensor data may include, but is not limited to, visual data, motion data, and/or orientation data.

According to various embodiments, a camera or other sensor located at a computing device may be communicably coupled with the computing device in any of various ways. For example, in the case of a mobile phone or laptop, the camera may be physically located within the computing device. As another example, in some configurations a camera or other sensor may be connected to the computing device via a cable. As still another example, a camera or other sensor may be in communication with the computing device via a wired or wireless communication link.

According to various embodiments, as used herein the term "depth sensor" may be used to refer to any of a variety of sensor types that may be used to determine depth information. For example, a depth sensor may include a projector and camera operating in infrared light frequencies. As another example, a depth sensor may include a projector and camera operating in visible light frequencies. For instance, a line-laser or light pattern projector may project a visible light pattern onto an object or surface, which may then be detected by a visible light camera.

In some implementations, a computing device may be equipped with more than one camera. For example, a smartphone may include cameras associated with different lenses, such as a normal lens, a wide-angle lens, and a telephoto lens. Images captured from these different lenses may be linked during the capture of visual data to facilitate later analysis. For instance, a wide-angle image may be used to identify a captured component relative to other components of an object, while a telephoto view captured by a different camera at the same time may be used to identify damage to the captured component.

One or more features of the captured visual data are extracted at 208. In some implementations, extracting one or more features of the object may involve constructing a multi-view capture that presents the object from different viewpoints. If a multi-view capture has already been constructed, then the multi-view capture may be updated based on the new visual data captured at 206. Alternatively, or additionally, feature extraction may involve performing one or more operations such as object recognition, component identification, orientation detection, or other such steps.

At 210, the extracted features are compared with the object model. According to various embodiments, comparing the extracted features to the object model may involve making any comparison suitable for determining whether the captured visual data are sufficient for performing damage comparison. Such operations may include, but are not limited to: applying a neural network to the captured visual data, comparing the captured visual data to reference visual data, and/or performing any of the operations discussed with respect to FIGS. 3 and 4.

A determination is made at 212 as to whether to capture additional visual data of the object. In some implementations, the determination may be made at least in part based on an analysis of the visual data that has already been captured.

In some embodiments, the system may analyze the captured visual data to determine whether a sufficient portion of the object has been captured in sufficient detail to support some objective, such as damage analysis, the construction of a 360-degree multi-view, or another such purpose. For example, the system may analyze the captured visual data to determine whether the object is depicted from all sides. As another example, the system may analyze the captured visual data to determine whether each panel or portion of the object is shown in a sufficient amount of detail. As yet another example, the system may analyze the captured visual data to determine whether each panel or portion of the object is shown from a sufficient number of viewpoints.

If the determination is made to capture additional visual data, then at 214 visual data collection guidance for capturing the additional visual data is determined. In some implementations, the visual data collection guidance may include any suitable instructions for capturing additional visual data that may assist in changing the determination made at 212. Such guidance may include an indication to capture additional visual data from a targeted viewpoint, to capture additional visual data of a designated portion of the object, or to capture additional visual data at a different level of clarity or detail. For example, if potential damage to an object is detected, then feedback may be provided to capture additional detail at the damaged location.

At 216, visual data collection feedback is provided. According to various embodiments, the visual data collection feedback may include any suitable instructions or information for assisting a user in collecting additional visual data. Such guidance may include, but is not limited to, instructions to collect visual data at a targeted camera position, orientation, or zoom level. Alternatively, or additionally, a user may be presented with instructions to capture a designated number of images or an image of a designated portion of the object.

For example, a user may be presented with a graphical guide to assist the user in capturing additional visual data from a target perspective. As another example, a user may be presented with written or verbal instructions to guide the user in capturing additional visual data. Additional techniques for determining and providing recording guidance as well as other related features are described in co-pending and commonly assigned U.S. patent application Ser. No. 15/992,546, titled "Providing Recording Guidance in Generating a Multi-View Interactive Digital Media Representation", filed May 20, 2018 by Holzer et al, which is hereby incorporated by reference in its entirety and for all purposes.

When it is determined not to capture additional visual data of the object, then at 218 the captured visual data is stored. In some embodiments, the captured visual data may be analyzed, structured, and/or presented, as discussed with respect to the methods 300 and 400 shown in FIGS. 4 and 5.

In some implementations, the captured visual data may be stored on a storage device and used to perform damage detection. Alternatively, or additionally, the images may be transmitted to a remote location via a network interface.

Figure 3:
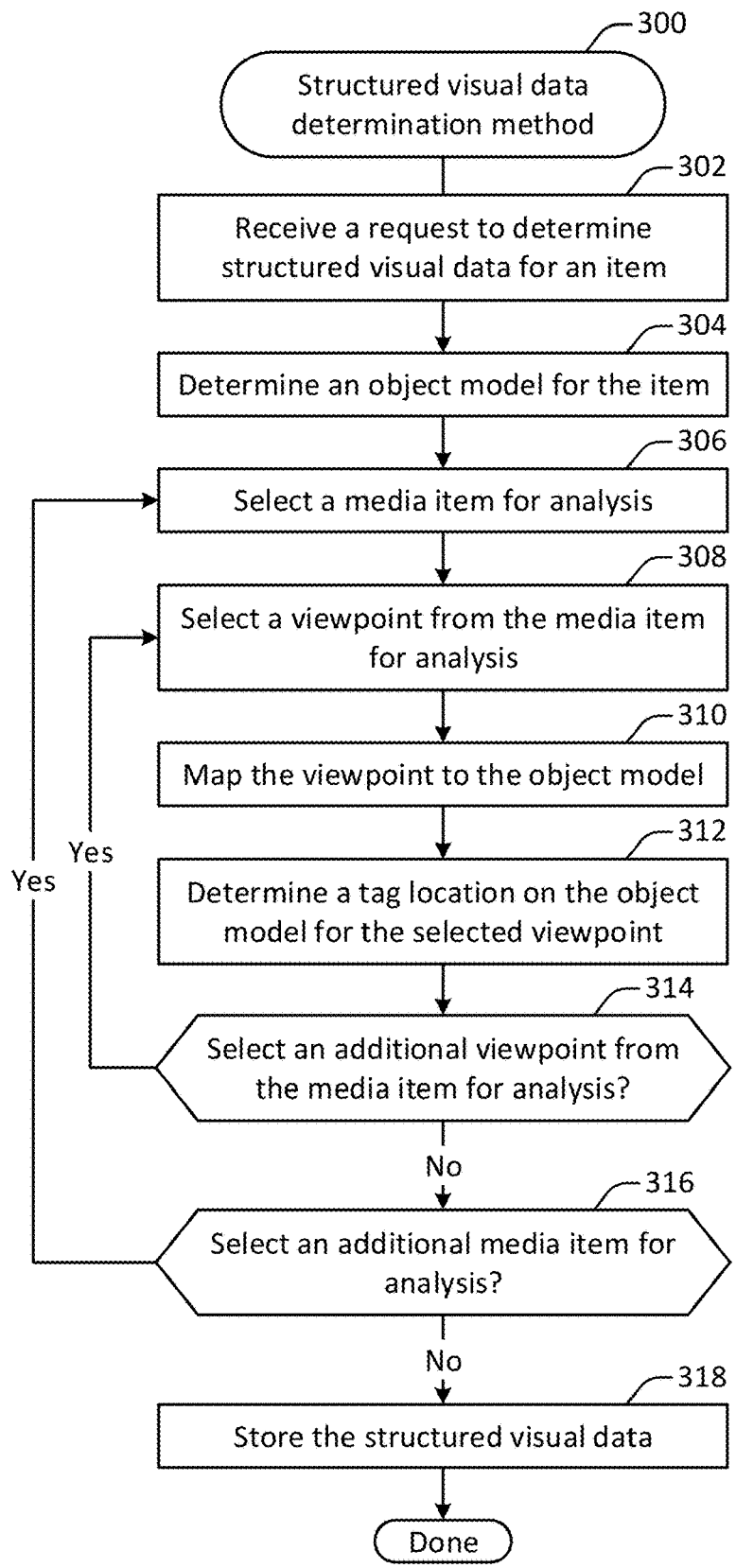
FIG. 3 illustrates a method for structuring visual data, performed in accordance with one or more embodiments.

FIG. 3 illustrates a method 300 for structuring visual data, performed in accordance with one or more embodiments. According to various embodiments, the method may be performed at any suitable computing device, such as a server, a client machine, or a server in communication with a client machine. A client machine may include one or more devices such as a laptop, a personal computer, or a smartphone.

A request to determine structured visual data for an item is received at 302. In some implementations, the request may be generated as discussed with respect to the method 100 shown in FIG. 1. For instance, the request may be generated automatically, or may be generated based on user input. The request received at 302 may identify visual data for analysis. For instance, the request may identify one or more images, image sets, multi-view captures, and/or video files.

An object model for the item is determined at 304. In some implementations, the object model may be determined based on user input. For instance, user input may be received that selects one of a set of available object models. Alternately, or additionally, the object model may be determined automatically. For instance, the system may analyze some or all of the input visual data to determine an object type. The object model may then be selected based on the object type.

According to various embodiments, the object model may be any suitable representation of the object. For example, the object model may be a three-dimensional skeleton, a two-dimensional skeleton, a top-down representation, or some other representation of the object. The object model may be stored as an image, as a computer-aided design (CAD) object, as a set of three-dimensional coordinates, or in any other suitable format.

A media item is selected for analysis at 306. According to various embodiments, a media item may include an individual image, a set of images, a multi-view capture, a video file, or any other suitable format for storing visual data. Media items may be grouped together based on user input. For instance, a user may capture a selection of media items related to an object. Alternatively, or additionally, visual data processing may reveal different media items to be related to the same object.

In particular embodiments, each media item may focus on the same object. For example, individual images, sets of images, or multi-view captures may capture the object from different perspective viewpoints, such as in a 360-degree arc around the object. As another example, a video file may capture the object as the camera moves around the object.

A viewpoint from the media item is selected for analysis at 308. In some embodiments, a viewpoint may refer to an individual image or video frame. Alternately, a viewpoint may refer to a collection of similar images and frames. For instance, it may be unnecessary to analyze each frame in a video. Instead, some frames may be selected for analysis. For example, keyframes may be selected for analysis. As another example, frames that are spaced apart by a designated period of time may be selected. As still another example, frames may be selected when the visual context changes.

The viewpoint may be mapped to the object model at 310. In some implementations, one or more of various mapping techniques may be used. For example, a dense pixel mapping may be performed. As another example, an image may be directly mapped to a tag location, for instance via a trained neural network. As still another example, the viewpoint may be analyzed to identify one or more object components included in the image. The viewpoint may then be mapped to the object model based on the identity of the one or more object components. As yet another example, the relative pose of the object model with respect to the camera view of the viewpoint may be estimated in order to estimate a corresponding tag location on the object model. Additional details regarding image mapping are discussed in the methods 500, 2200, and 2300 shown in FIGS. 5, 22, and 23.

A tag location on the object model may be determined at 312 based on the viewpoint mapping performed at 310. In some implementations, determining the tag location may involve identifying a location in the object model corresponding to the location mapped to the viewpoint at 310. For example, if the selected viewpoint is mapped to the left front door of a vehicle at 310, then a tag may be created on the left front door of the object model, and the selected viewpoint associated with that tag. The selected viewpoint may be associated with the tag by identifying, for instance, an image name, a viewpoint for a multi-view capture, or a time-code for a video file.

In some implementations, object mapping and tagging for viewpoints may be used in conjunction with automatic damage detection. For instance, the system may automatically detect damage in the provided data. Then, the system may mark the damage on the object model via one or more tags and/or in the structured visual data. In this way, a reviewer may easily identify visual data that shows damage to the object and identify which files, images, time periods, and/or multi-view representations are relevant to the damage. Additional details regarding automatic damage detection are discussed in co-pending and commonly assigned U.S. patent application Ser. No. 16/692,133 by Holzer et al., titled DAMAGE DETECTION FROM MULTI-VIEW VISUAL DATA, filed Nov. 22, 2019, which is hereby incorporated by reference in its entirety and for all purposes.

A determination is made at 314 as to whether to select an additional viewpoint from the media item for analysis. If the determination is made not to select an additional viewpoint, then at 316 a determination is made as to whether to select an additional media item for analysis. According to various embodiments, each viewpoint and each media item may be analyzed until all viewpoints and media items have been analyzed.

When it is determined not to select an additional media item for analysis, then at 318 the structured visual data is stored. In some implementations, the structured visual data may include any or all of a variety of information. For example, the structured visual data may include one or more of the media items selected at 306. As another example, the structured visual data may include the object model determined at 304, or a reference to that object model. As still another example, the structured visual data may include one or more of the viewpoint mappings determined at 310. As yet another example, the structured visual data may include one or more of the tag locations determined at 312.

Figure 4:
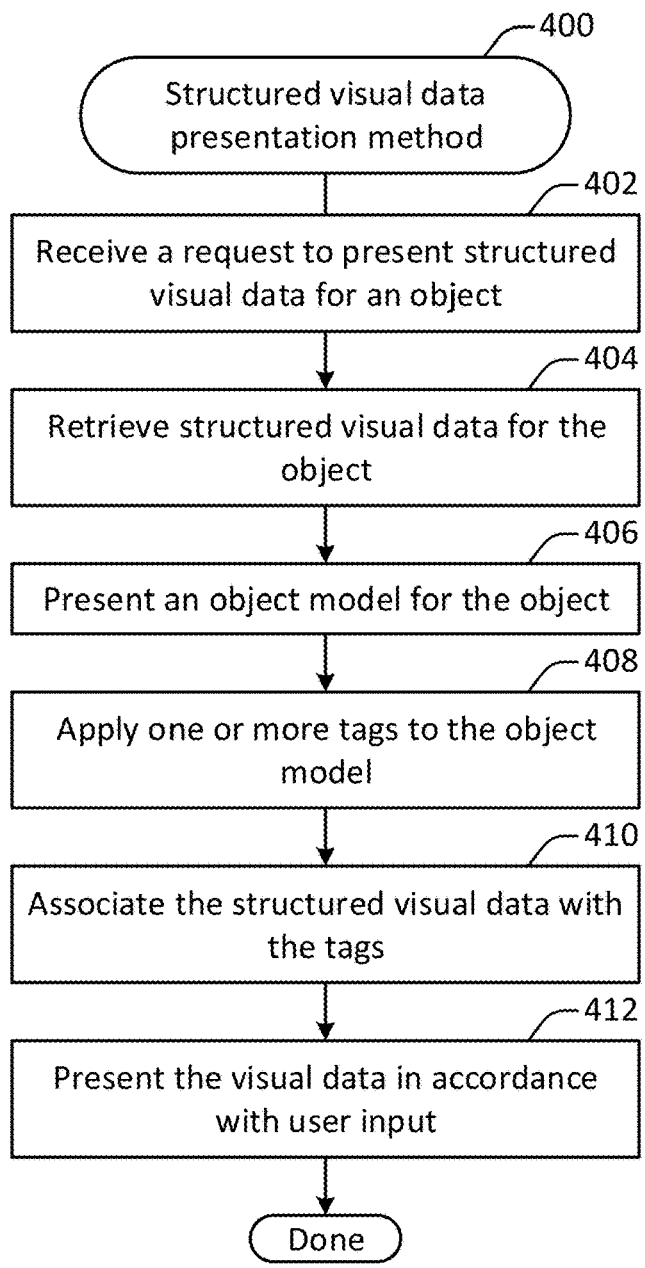
FIG. 4 illustrates a method for presenting structured visual data, performed in accordance with one or more embodiments.

In some implementations, storing the structured visual data may involve transmitting some or all of the structured visual data to a storage medium. Alternately, or additionally, some or all of the structured visual data may be stored in memory, transmitted via a communication interface via a network, and/or sent to a network attached storage device. FIG. 4 illustrates a method 400 for presenting structured visual data, performed in accordance with one or more embodiments. According to various embodiments, the method 400 may be performed at any suitable computing device having a display screen and a user input device for presenting the structured visual data. For instance, the method 400 may be performed at a smartphone, laptop computer, or desktop computer.

Figure 19:
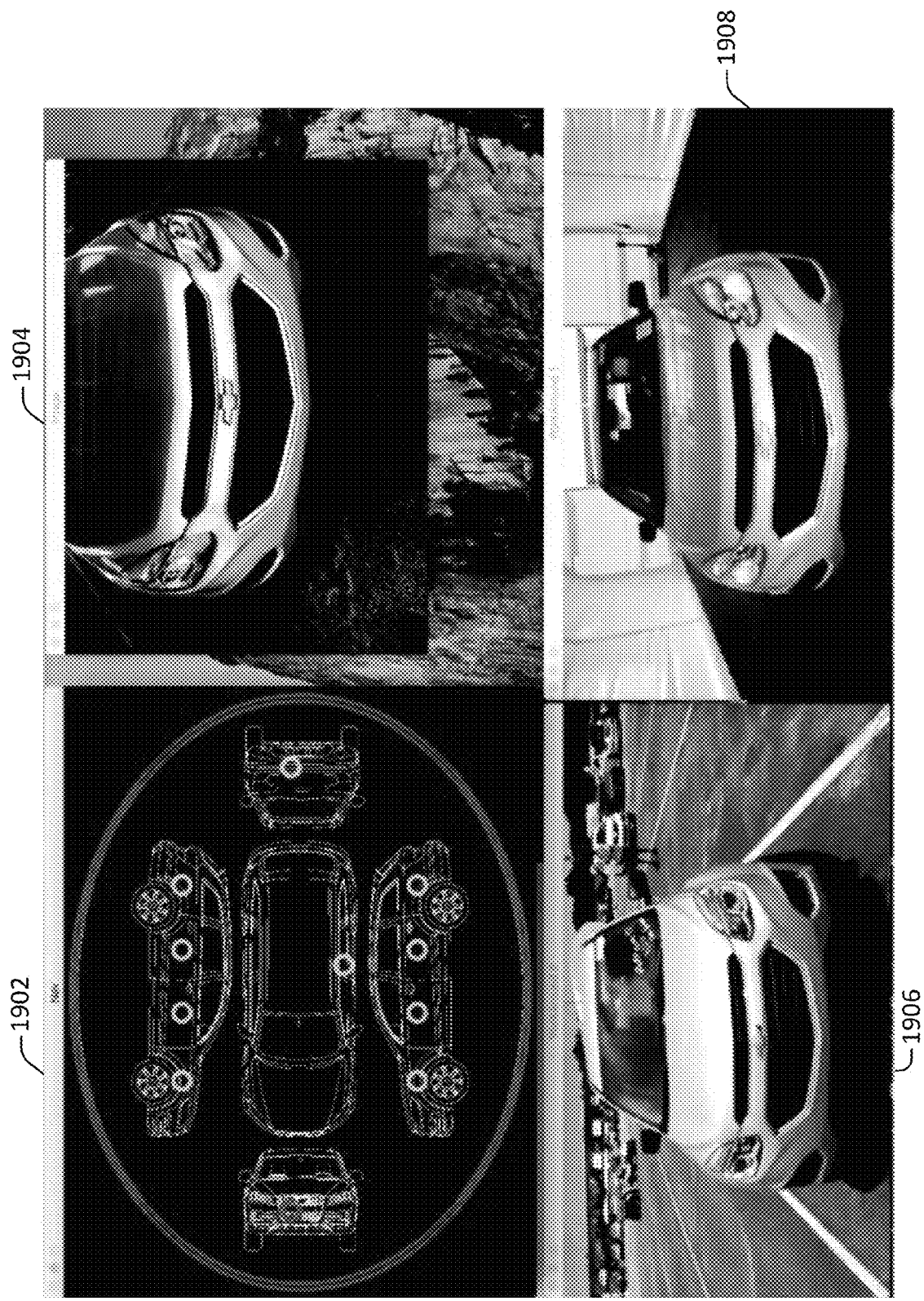
FIGS. 19, 20, and 21 illustrate examples of user interfaces in which structured visual data is presented, provided in accordance with one or more embodiments.
Figure 20:
Figure 21:

FIGS. 19, 20, and 21 illustrate examples of user interfaces in which structured visual data is presented, provided in accordance with one or more embodiments. The method 400 is described in part by reference to FIGS. 19, 20, and 21.

A request to present structured visual data for an object is received at 400. In some implementations, the request may be generated based on user input. For instance, a user may select an object or visual data associated with an object for presentation in a user interface.

Structured visual data for the object is retrieved at 404. In some implementations, the structured visual data may be retrieved from a storage device, received via a communication interface, or retrieved in some other fashion.

An object model for the object is presented at 406. In some implementations, the object model may be any suitable representation of the object that allows the user to navigate the structured visual data. For instance, the object model may include one or more perspective and/or top-down views of the object. In some configurations, the object model may be an abstract (e.g., wire-frame or skeleton) view of the object. As discussed with respect to the method 300, the object model may be included with, or referenced by, the structured visual data.

An example of an object model is shown at 1902 in FIGS. 19, 20, and 21. The object model 1902 shows an abstract, wire-frame, top-down view of a vehicle. However, as discussed herein, according to various embodiments various types of object models may be used.

One or more tags are applied to the object model at 408. In some implementations, the tags may be applied based on the association between tags and object model determined as discussed with respect to FIG. 3.

The example of an object model 1902 shown in FIG. 20 includes several tags, represented as circles. However, tags may be represented by any suitable images, videos, shapes, text, or other visual representations according to one or more embodiments.

According to various embodiments, each tag corresponds to a location on or component of the object represented by the object model. For instance, the object model 1902 includes tags on vehicle components such as door panels and the front and rear of the vehicle. However, tags may be placed at any suitable location, depending for instance on user selection and/or the context of the object being represented.

The structured visual data is associated with the tags at 410. According to various embodiments, the structured visual data may be associated with the tags based on the correspondence identified as discussed with respect to FIG. 3. Associating the structured visual data with the tags may involve logically linking the tags with the structured visual data to allow a user to navigate to the visual data by accessing a corresponding tag.

The visual data is presented in accordance with user input at 412. In some implementations, presenting the visual data in accordance with user input may involve presenting the object model and associated tags in a user interface and receiving user input to navigate the structured visual data.

For example, a user may employ a mouse or touch screen to click on a tag, at which point the corresponding structured visual data may be presented. As another example, a user may navigate around the object via the object model, at which point the visual data corresponding to the associated perspective of the object may be presented.

For example, FIG. 19 shows a selected tag on the object model 1902. The selected tag is marked in red in FIG. 19. According to various embodiments, because the selected tag corresponds with the front of the vehicle, the user interface is automatically updated to present structured visual data of the front of the vehicle. For example, the user interface shown in FIG. 19 includes an image portion 1904, a multi-view capture portion 1906, and a video portion 1908. Because the selected tag corresponds with the front of the vehicle, an image 1904 of the front of the vehicle is selected and presented. Similarly, a view 1906 from the multi-view capture of the front of the vehicle is selected and presented. Similarly, the video is navigated to a portion 1908 in which the front of the vehicle is presented.

According to various embodiments, techniques and mechanisms described herein may be used to analyze and present visual data captured at different times and in different locations. For example, in FIG. 19, the image 1904 was captured at night, while the multi-view capture 1906 was captured during the day, and the video 1908 was captured in a different, indoor location. In such a way, an object may be represented at different times, before and after an event, and/or in different circumstances.

Another example of the user interface is shown in FIG. 20. FIG. 20 shows a different selected tag on the object model 1902, marked in red. According to various embodiments, because the selected tag corresponds with the front left door of the vehicle, the user interface is automatically updated to present structured visual data of the front left door of the vehicle. For example, an image 2004 of the front left door of the vehicle is selected and presented. Similarly, a view 2006 from the multi-view capture of the front left door of the vehicle is selected and presented. Similarly, the video is navigated to a portion 2008 in which the front left door of the vehicle is presented.

Another example of the user interface is shown in FIG. 21. FIG. 21 shows a view in which the user's cursor is navigated to a position between two tags, near that back right of the vehicle. Even though the cursor is not directly over a tag, the user interface may be updated to present structured visual data corresponding to the identified perspective. For instance, in FIG. 21, a viewpoint of the back right of the vehicle is selected and presented in both the multi-view capture 2106 and the video 2108. However, because the image set does not include an image captured from that perspective, the closest available image is selected and presented at 2104.

According to various embodiments, techniques and mechanisms described herein may be used to analyze and present visual data captured at different times and in different locations. For example, in FIG. 19, the image 1904 was captured at night, while the multi-view capture 1906 was captured during the day, and the video 1908 was captured in a different, indoor location. In such a way, an object may be represented at different times, before and after an event, and/or in different circumstances. Additional details regarding these differences can be seen in the corresponding views presented in FIG. 20.

In some embodiments, one or more elements from the methods 100, 200, 300, and 400 may be performed in concert. For example, visual data may be analyzed and presented during the visual data capture process. For instance, an object model may be iteratively updated based on visual data so that a user may observe the structured visual data while capturing the raw visual data.

In some embodiments, one or more of the elements from the methods 100, 200, 300, and 400 may be omitted. For instance, structured visual data may be analyzed and presented without providing recording guidance for capturing the raw visual data.

Figure 5:
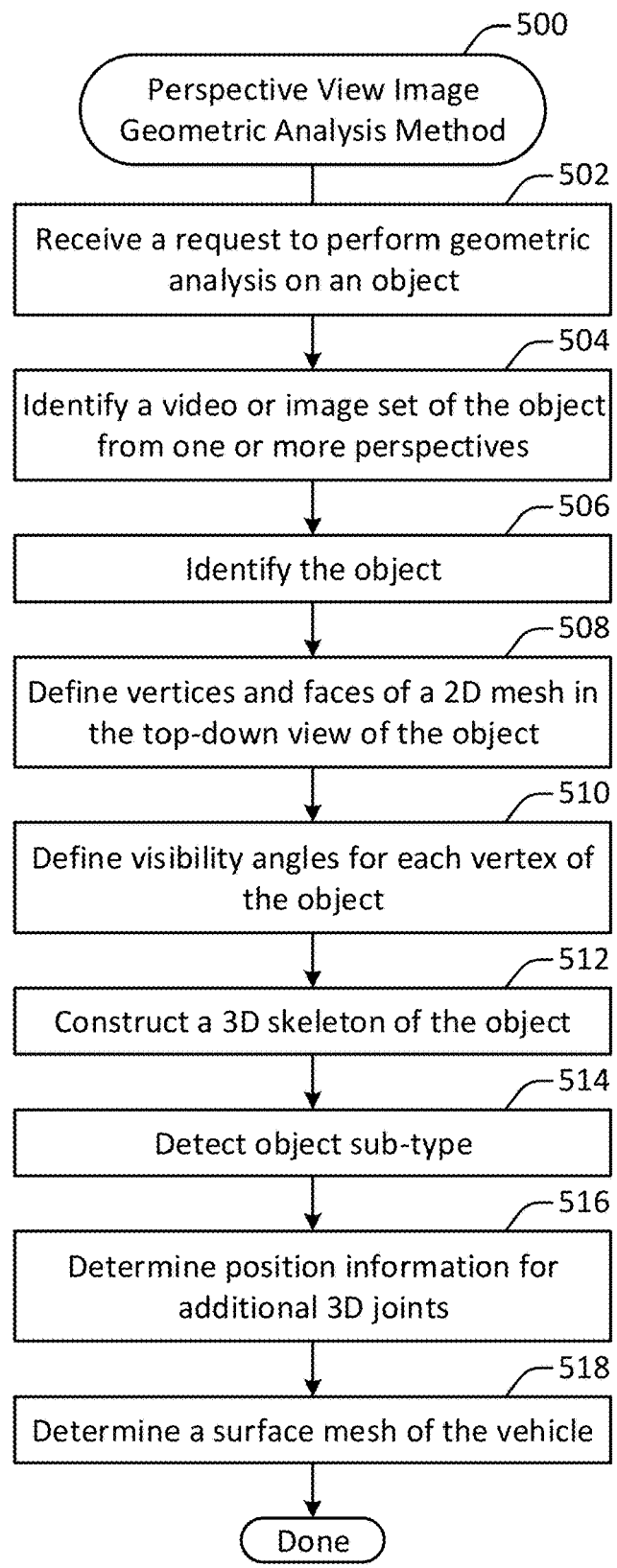
FIG. 5 illustrates one example of a method for performing geometric analysis of a perspective view image, performed in accordance with one or more embodiments.

FIG. 5 illustrates one example of a method 500 for performing geometric analysis of a perspective view image, performed in accordance with one or more embodiments. The method 500 may be performed on any suitable computing device. For example, the method 500 may be performed on a mobile computing device such as a smart phone. Alternately, or additionally, the method 500 may be performed on a remote server in communication with a mobile computing device.

A request to perform geometric analysis on an object is received at 502. According to various embodiments, the request may be received as part of a procedure for generating a cinematic video. For example, the method 500 may be used to determine object pose and/or other information for an object in order to include the object within a cinematic video At 504, a video or image set of the object captured from one or more perspectives is identified. The video or image set is referred to herein as "source data". According to various embodiments, the source data may include a 360-degree view of the object. Alternately, the source data may include a view that has less than 360-degree coverage.

In some embodiments, the source data may include data captured from a camera. For example, the camera may be located on a mobile computing device such a mobile phone. As another example, one or more traditional cameras may be used to capture such information.

In some implementations, the source data may include data collected from an inertial measurement unit (IMU). IMU data may include information such as camera location, camera angle, device velocity, device acceleration, or any of a wide variety of data collected from accelerometers or other such sensors.

The object is identified at 506. In some implementations, the object may be identified based on user input. For example, a user may identify the object as a vehicle or person via a user interface component such as a drop-down menu.

In some embodiments, the object may be identified based on image recognition. For example, the source data may be analyzed to determine that the subject of the source data is a vehicle, a person, or another such object. The source data may include a variety of image data. However, in case of a multi-view capture the source data focuses in a particular object from different viewpoints, the image recognition procedure may identify commonalities between the different perspective views to isolate the object that is the subject of the source data from other objects that are present in some portion of the source data but not in other portions of the source data.

At 508, vertices and faces of a 2D mesh are defined in the top-down view of the object. According to various embodiments, each face may represent a part of the object surface that could be approximated as being planar. For example, when a vehicle is captured in the source data, the vehicle's door panel or roof may be represented as a face in a 2D mesh because the door and roof are approximately planar despite being slightly curved.

In some embodiments, vertices and faces of a 2D mesh may be identified by analyzing the source data. Alternately, or additionally, the identification of the object at 206 may allow for the retrieval of a predetermined 2D mesh. For example, a vehicle object may be associated with a default 2D mesh that may be retrieved upon request.

Visibility angles are determined for each vertex of the object at 510. According to various embodiments, a visibility angle indicates the range of object angles with respect to the camera for which the vertex is visible. In some embodiments, visibility angles of a 2D mesh may be identified by analyzing the source data. Alternately, or additionally, the identification of the object at 506 may allow for the retrieval of predetermined visibility angle along with a predetermined 2D mesh. For example, a vehicle object may be associated with a default 2D mesh with associated visibility angle that may be retrieved upon request.

A 3D skeleton of the object is constructed at 512. According to various embodiments, constructing a 3D skeleton may involve any of a variety of operations. For example, 2D skeleton detection may be performed on every frame using a machine learning procedure. As another example, 3D camera pose estimation may be performed to determine a location and angle of the camera with respect to the object for a particular frame. As yet another example, a 3D skeleton may be reconstructed from 2D skeletons and or poses.

Various embodiments described herein relate generally to systems and methods for analyzing the spatial relationship between multiple images and video together with location information data, for the purpose of creating a single representation, a multi-view image digital media representation (MVIDMR, also referred to as a multi-view capture), which eliminates redundancy in the data, and presents a user with an interactive and immersive active viewing experience. According to various embodiments, active is described in the context of providing a user with the ability to control the viewpoint of the visual information displayed on a screen.

In particular example embodiments, augmented reality (AR) is used to aid a user in capturing the multiple images used in a MVIDMR. For example, a virtual guide can be inserted into live image data from a mobile. The virtual guide can help the user guide the mobile device along a desirable path useful for creating the MVIDMR. The virtual guide in the AR images can respond to movements of the mobile device. The movement of mobile device can be determined from a number of different sources, including but not limited to an Inertial Measurement Unit and image data.

Various aspects also relate generally to systems and methods for providing feedback when generating a MVIDMR. For example, object recognition may be used to recognize an object present in a MVIDMR. Then, feedback such as one or more visual indicators may be provided to guide the user in collecting additional MVIDMR data to collect a high-quality MVIDMR of the object. As another example, a target view may be determined for a MVIDMR, such as the terminal point when capturing a 360-degree MVIDMR. Then, feedback such as one or more visual indicators may be provided to guide the user in collecting additional MVIDMR data to reach the target view.

Figure 6:
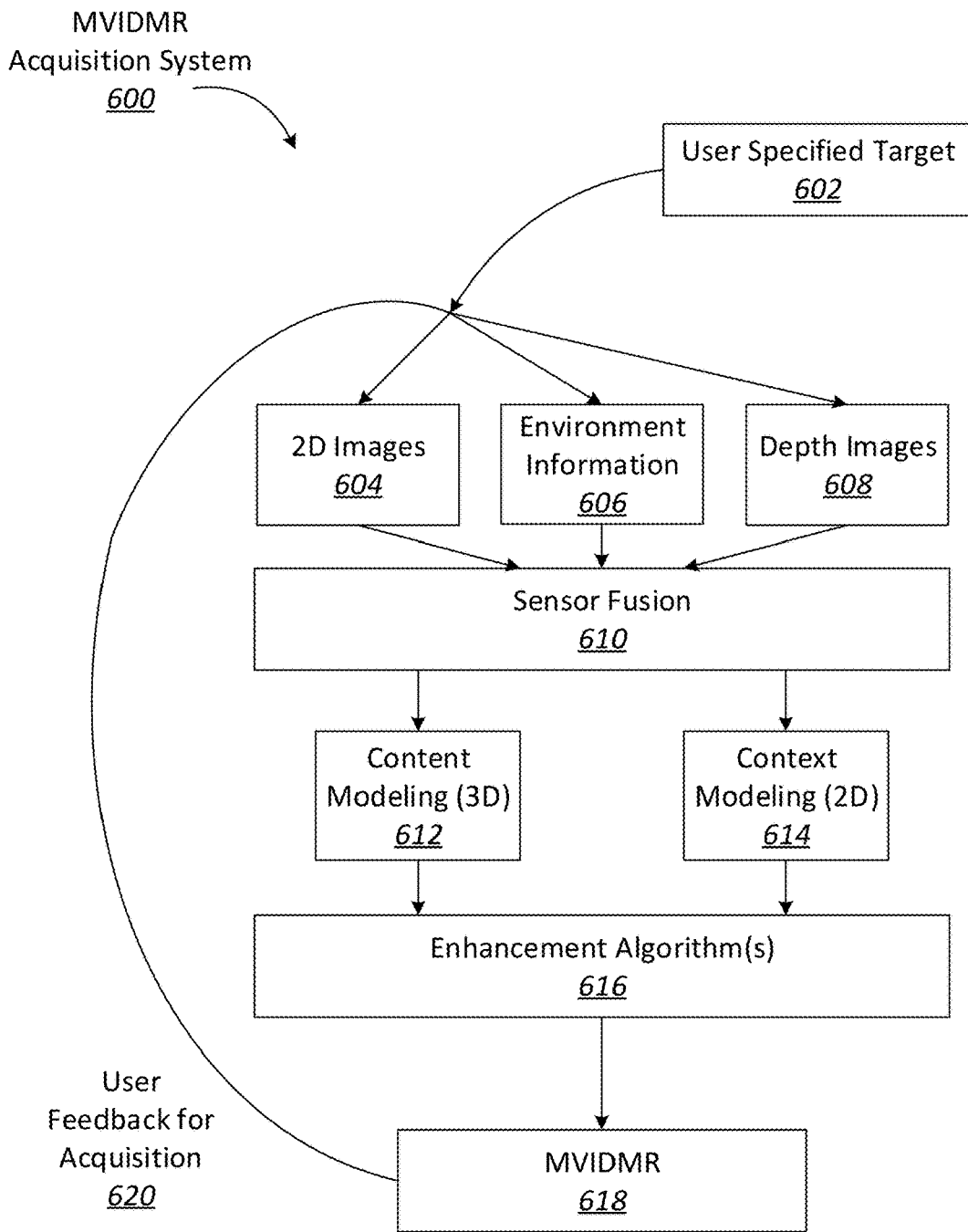
FIG. 6 illustrates an example of a multi-view image digital media representation (MVIDMR) acquisition system, configured in accordance with one or more embodiments.

FIG. 6 shows and example of a MVIDMR acquisition system 600, configured in accordance with one or more embodiments. The MVIDMR acquisition system 600 is depicted in a flow sequence that can be used to generate a MVIDMR. According to various embodiments, the data used to generate a MVIDMR can come from a variety of sources.

In particular, data such as, but not limited to two-dimensional (2D) images 604 can be used to generate a MVIDMR. These 2D images can include color image data streams such as multiple image sequences, video data, etc., or multiple images in any of various formats for images, depending on the application. As will be described in more detail below with respect to FIGS. 7A-11B, during an image capture process, an AR system can be used. The AR system can receive and augment live image data with virtual data. In particular, the virtual data can include guides for helping a user direct the motion of an image capture device.

Another source of data that can be used to generate a MVIDMR includes environment information 606. This environment information 606 can be obtained from sources such as accelerometers, gyroscopes, magnetometers, GPS, WiFi, IMU-like systems (Inertial Measurement Unit systems), and the like. Yet another source of data that can be used to generate a MVIDMR can include depth images 608. These depth images can include depth, 3D, or disparity image data streams, and the like, and can be captured by devices such as, but not limited to, stereo cameras, time-of-flight cameras, three-dimensional cameras, and the like.

In some embodiments, the data can then be fused together at sensor fusion block 610. In some embodiments, a MVIDMR can be generated a combination of data that includes both 2D images 604 and environment information 606, without any depth images 608 provided. In other embodiments, depth images 608 and environment information 606 can be used together at sensor fusion block 610. Various combinations of image data can be used with environment information at 606, depending on the application and available data.

In some embodiments, the data that has been fused together at sensor fusion block 610 is then used for content modeling 612 and context modeling 614. As described in more detail with regard to FIG. 9, the subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional image in some embodiments, as described in more detail below with regard to FIG. 9. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. According to various embodiments, the models provided by content modeling 612 and context modeling 614 can be generated by combining the image and location information data, as described in more detail with regard to FIG. 8.

According to various embodiments, context and content of a MVIDMR are determined based on a specified object of interest. In some embodiments, an object of interest is automatically chosen based on processing of the image and location information data. For instance, if a dominant object is detected in a series of images, this object can be selected as the content. In other examples, a user specified target 602 can be chosen, as shown in FIG. 6. It should be noted, however, that a MVIDMR can be generated without a user-specified target in some applications.

In some embodiments, one or more enhancement algorithms can be applied at enhancement algorithm(s) block 616. In particular example embodiments, various algorithms can be employed during capture of MVIDMR data, regardless of the type of capture mode employed. These algorithms can be used to enhance the user experience. For instance, automatic frame selection, stabilization, view interpolation, filters, and/or compression can be used during capture of MVIDMR data. In some embodiments, these enhancement algorithms can be applied to image data after acquisition of the data. In other examples, these enhancement algorithms can be applied to image data during capture of MVIDMR data.

According to various embodiments, automatic frame selection can be used to create a more enjoyable MVIDMR. Specifically, frames are automatically selected so that the transition between them will be smoother or more even. This automatic frame selection can incorporate blur- and over-exposure-detection in some applications, as well as more uniformly sampling poses such that they are more evenly distributed.

In some embodiments, stabilization can be used for a MVIDMR in a manner similar to that used for video. In particular, keyframes in a MVIDMR can be stabilized for to produce improvements such as smoother transitions, improved/enhanced focus on the content, etc. However, unlike video, there are many additional sources of stabilization for a MVIDMR, such as by using IMU information, depth information, computer vision techniques, direct selection of an area to be stabilized, face detection, and the like.

For instance, IMU information can be very helpful for stabilization. In particular, IMU information provides an estimate, although sometimes a rough or noisy estimate, of the camera tremor that may occur during image capture. This estimate can be used to remove, cancel, and/or reduce the effects of such camera tremor.

In some embodiments, depth information, if available, can be used to provide stabilization for a MVIDMR. Because points of interest in a MVIDMR are three-dimensional, rather than two-dimensional, these points of interest are more constrained and tracking/matching of these points is simplified as the search space reduces. Furthermore, descriptors for points of interest can use both color and depth information and therefore, become more discriminative. In addition, automatic or semi-automatic content selection can be easier to provide with depth information. For instance, when a user selects a particular pixel of an image, this selection can be expanded to fill the entire surface that touches it. Furthermore, content can also be selected automatically by using a foreground/background differentiation based on depth. According to various embodiments, the content can stay relatively stable/visible even when the context changes.

According to various embodiments, computer vision techniques can also be used to provide stabilization for MVIDMRs. For instance, keypoints can be detected and tracked. However, in certain scenes, such as a dynamic scene or static scene with parallax, no simple warp exists that can stabilize everything. Consequently, there is a trade-off in which certain aspects of the scene receive more attention to stabilization and other aspects of the scene receive less attention. Because a MVIDMR is often focused on a particular object of interest, a MVIDMR can be content-weighted so that the object of interest is maximally stabilized in some examples.

Another way to improve stabilization in a MVIDMR includes direct selection of a region of a screen. For instance, if a user taps to focus on a region of a screen, then records a convex MVIDMR, the area that was tapped can be maximally stabilized. This allows stabilization algorithms to be focused on a particular area or object of interest.

In some embodiments, face detection can be used to provide stabilization. For instance, when recording with a front-facing camera, it is often likely that the user is the object of interest in the scene. Thus, face detection can be used to weight stabilization about that region. When face detection is precise enough, facial features themselves (such as eyes, nose, and mouth) can be used as areas to stabilize, rather than using generic keypoints. In another example, a user can select an area of image to use as a source for keypoints.

According to various embodiments, view interpolation can be used to improve the viewing experience. In particular, to avoid sudden "jumps" between stabilized frames, synthetic, intermediate views can be rendered on the fly. This can be informed by content-weighted keypoint tracks and IMU information as described above, as well as by denser pixel-to-pixel matches. If depth information is available, fewer artifacts resulting from mismatched pixels may occur, thereby simplifying the process. As described above, view interpolation can be applied during capture of a MVIDMR in some embodiments. In other embodiments, view interpolation can be applied during MVIDMR generation.

In some embodiments, filters can also be used during capture or generation of a MVIDMR to enhance the viewing experience. Just as many popular photo sharing services provide aesthetic filters that can be applied to static, two-dimensional images, aesthetic filters can similarly be applied to surround images. However, because a MVIDMR representation is more expressive than a two-dimensional image, and three-dimensional information is available in a MVIDMR, these filters can be extended to include effects that are ill-defined in two dimensional photos. For instance, in a MVIDMR, motion blur can be added to the background (i.e. context) while the content remains crisp. In another example, a drop-shadow can be added to the object of interest in a MVIDMR.

According to various embodiments, compression can also be used as an enhancement algorithm 616. In particular, compression can be used to enhance user-experience by reducing data upload and download costs. Because MVIDMRs use spatial information, far less data can be sent for a MVIDMR than a typical video, while maintaining desired qualities of the MVIDMR. Specifically, the IMU, keypoint tracks, and user input, combined with the view interpolation described above, can all reduce the amount of data that must be transferred to and from a device during upload or download of a MVIDMR. For instance, if an object of interest can be properly identified, a variable compression style can be chosen for the content and context. This variable compression style can include lower quality resolution for background information (i.e. context) and higher quality resolution for foreground information (i.e. content) in some examples. In such examples, the amount of data transmitted can be reduced by sacrificing some of the context quality, while maintaining a desired level of quality for the content.

In the present embodiment, a MVIDMR 618 is generated after any enhancement algorithms are applied. The MVIDMR can provide a multi-view interactive digital media representation. According to various embodiments, the MVIDMR can include three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, MVIDMRs provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with MVIDMRs that allow the MVIDMRs to be indexed with a high degree of efficiency and accuracy; and the ability of the user to interact and change the viewpoint of the MVIDMR. In particular example embodiments, the characteristics described above can be incorporated natively in the MVIDMR representation, and provide the capability for use in various applications. For instance, MVIDMRs can be used to enhance various fields such as e-commerce, visual search, 3D printing, file sharing, user interaction, and entertainment.

According to various example embodiments, once a MVIDMR 618 is generated, user feedback for acquisition 620 of additional image data can be provided. In particular, if a MVIDMR is determined to need additional views to provide a more accurate model of the content or context, a user may be prompted to provide additional views. Once these additional views are received by the MVIDMR acquisition system 600, these additional views can be processed by the system 600 and incorporated into the MVIDMR.

Figure 7:
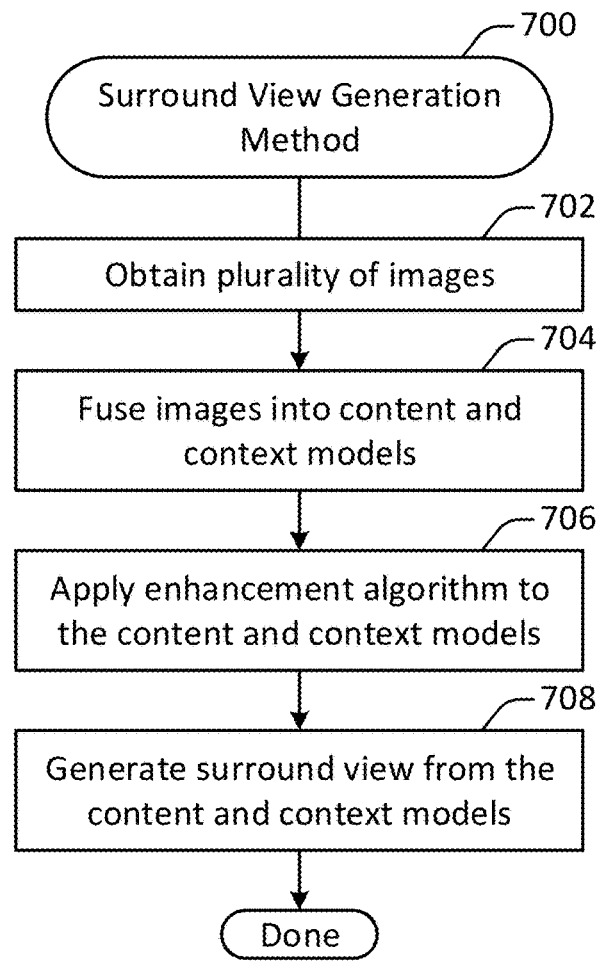
FIG. 7 illustrates one example of a method for generating a MVIDMR, performed in accordance with one or more embodiments.

FIG. 7 shows an example of a process flow diagram for generating a MVIDMR 700. In the present example, a plurality of images is obtained at 702. According to various embodiments, the plurality of images can include two-dimensional (2D) images or data streams. These 2D images can include location information that can be used to generate a MVIDMR. In some embodiments, the plurality of images can include depth images 608, as also described above with regard to FIG. 6. The depth images can also include location information in various examples.

In some embodiments, when the plurality of images is captured, images output to the user can be augmented with the virtual data. For example, the plurality of images can be captured using a camera system on a mobile device. The live image data, which is output to a display on the mobile device, can include virtual data, such as guides and status indicators, rendered into the live image data. The guides can help a user guide a motion of the mobile device. The status indicators can indicate what portion of images needed for generating a MVIDMR have been captured. The virtual data may not be included in the image data captured for the purposes of generating the MVIDMR.

According to various embodiments, the plurality of images obtained at 702 can include a variety of sources and characteristics. For instance, the plurality of images can be obtained from a plurality of users. These images can be a collection of images gathered from the internet from different users of the same event, such as 2D images or video obtained at a concert, etc. In some embodiments, the plurality of images can include images with different temporal information. In particular, the images can be taken at different times of the same object of interest. For instance, multiple images of a particular statue can be obtained at different times of day, different seasons, etc. In other examples, the plurality of images can represent moving objects. For instance, the images may include an object of interest moving through scenery, such as a vehicle traveling along a road or a plane traveling through the sky. In other instances, the images may include an object of interest that is also moving, such as a person dancing, running, twirling, etc.

In some embodiments, the plurality of images is fused into content and context models at 704. According to various embodiments, the subject matter featured in the images can be separated into content and context. The content can be delineated as the object of interest and the context can be delineated as the scenery surrounding the object of interest.

According to various embodiments, the content can be a three-dimensional model, depicting an object of interest, and the content can be a two-dimensional image in some embodiments.

According to the present example embodiment, one or more enhancement algorithms can be applied to the content and context models at 706. These algorithms can be used to enhance the user experience. For instance, enhancement algorithms such as automatic frame selection, stabilization, view interpolation, filters, and/or compression can be used. In some embodiments, these enhancement algorithms can be applied to image data during capture of the images. In other examples, these enhancement algorithms can be applied to image data after acquisition of the data.

In the present embodiment, a MVIDMR is generated from the content and context models at 708. The MVIDMR can provide a multi-view interactive digital media representation. According to various embodiments, the MVIDMR can include a three-dimensional model of the content and a two-dimensional model of the context. According to various embodiments, depending on the mode of capture and the viewpoints of the images, the MVIDMR model can include certain characteristics. For instance, some examples of different styles of MVIDMRs include a locally concave MVIDMR, a locally convex MVIDMR, and a locally flat MVIDMR. However, it should be noted that MVIDMRs can include combinations of views and characteristics, depending on the application.

Figure 8:
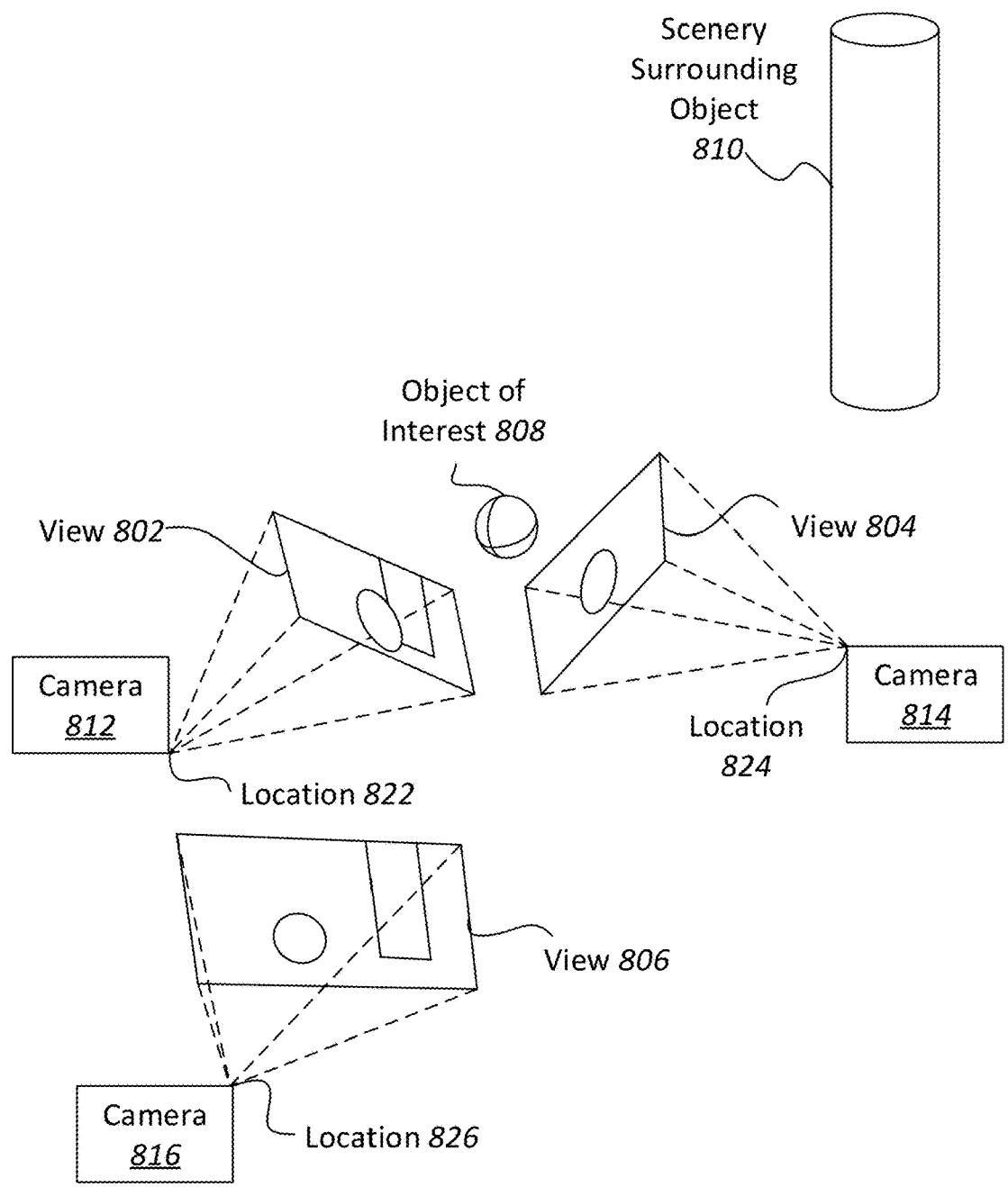
FIG. 8 illustrates one example of multiple camera views fused together into a three-dimensional (3D) model.

FIG. 8 shows an example of multiple camera views that can be fused together into a three-dimensional (3D) model to create an immersive experience. According to various embodiments, multiple images can be captured from various viewpoints and fused together to provide a MVIDMR. In some embodiments, three cameras 812, 814, and 816 are positioned at locations 822, 824, and 826, respectively, in proximity to an object of interest 808. Scenery can surround the object of interest 808 such as object 810. Views 802, 804, and 806 from their respective cameras 812, 814, and 816 include overlapping subject matter. Specifically, each view 802, 804, and 806 includes the object of interest 808 and varying degrees of visibility of the scenery surrounding the object 810. For instance, view 802 includes a view of the object of interest 808 in front of the cylinder that is part of the scenery surrounding the object 810. View 806 shows the object of interest 808 to one side of the cylinder, and view 804 shows the object of interest without any view of the cylinder.

In some embodiments, the various views 802, 804, and 816 along with their associated locations 822, 824, and 826, respectively, provide a rich source of information about object of interest 808 and the surrounding context that can be used to produce a MVIDMR. For instance, when analyzed together, the various views 802, 804, and 826 provide information about different sides of the object of interest and the relationship between the object of interest and the scenery. According to various embodiments, this information can be used to parse out the object of interest 808 into content and the scenery as the context. Furthermore, various algorithms can be applied to images produced by these viewpoints to create an immersive, interactive experience when viewing a MVIDMR.

Figure 9:
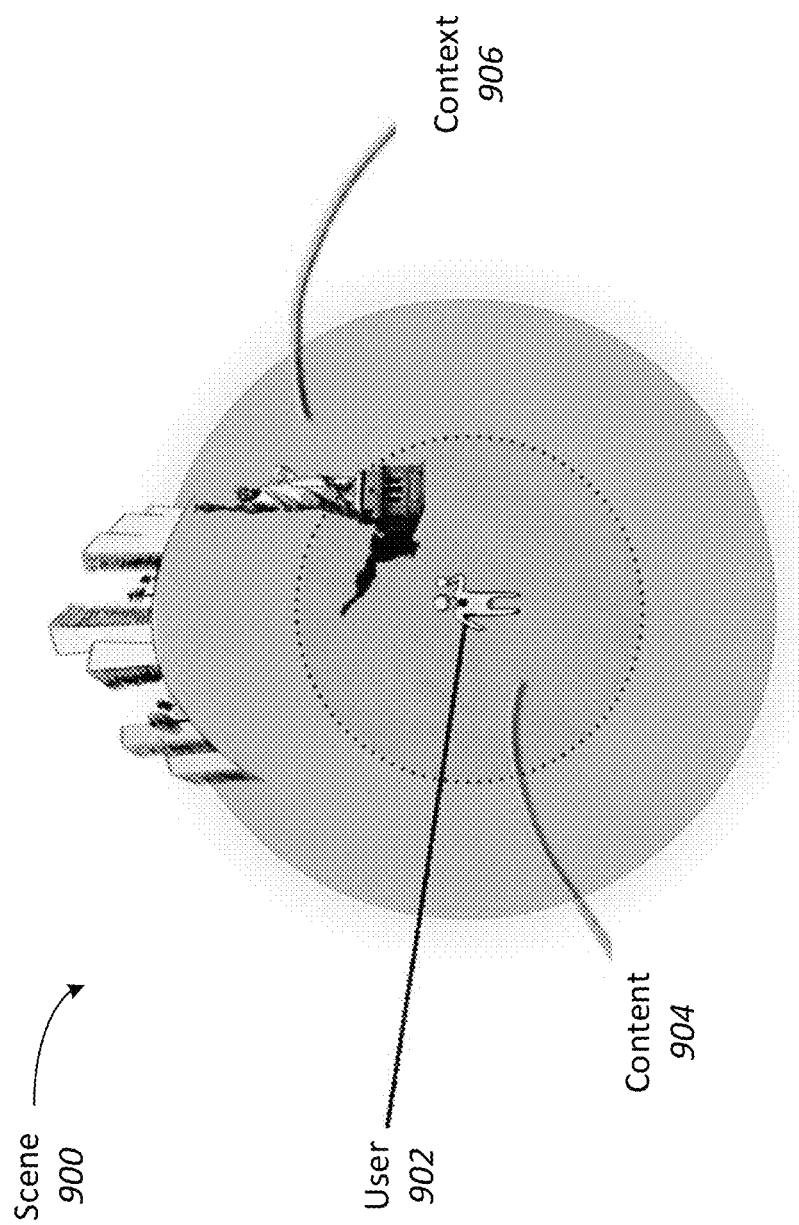
FIG. 9 illustrates one example of separation of content and context in a MVIDMR.

FIG. 9 illustrates one example of separation of content and context in a MVIDMR. According to various embodiments, a MVIDMR is a multi-view interactive digital media representation of a scene 900. With reference to FIG. 9, shown is a user 902 located in a scene 900. The user 902 is capturing images of an object of interest, such as a statue. The images captured by the user constitute digital visual data that can be used to generate a MVIDMR.

According to various embodiments of the present disclosure, the digital visual data included in a MVIDMR can be, semantically and/or practically, separated into content 904 and context 906. According to particular embodiments, content 904 can include the object(s), person(s), or scene(s) of interest while the context 906 represents the remaining elements of the scene surrounding the content 904. In some embodiments, a MVIDMR may represent the content 904 as three-dimensional data, and the context 906 as a two-dimensional panoramic background. In other examples, a MVIDMR may represent both the content 904 and context 906 as two-dimensional panoramic scenes. In yet other examples, content 904 and context 906 may include three-dimensional components or aspects. In particular embodiments, the way that the MVIDMR depicts content 904 and context 906 depends on the capture mode used to acquire the images.

In some embodiments, such as but not limited to: recordings of objects, persons, or parts of objects or persons, where only the object, person, or parts of them are visible, recordings of large flat areas, and recordings of scenes where the data captured appears to be at infinity (i.e., there are no subjects close to the camera), the content 904 and the context 906 may be the same. In these examples, the MVIDMR produced may have some characteristics that are similar to other types of digital media such as panoramas. However, according to various embodiments, MVIDMRs include additional features that distinguish them from these existing types of digital media. For instance, a MVIDMR can represent moving data.

Additionally, a MVIDMR is not limited to a specific cylindrical, spherical or translational movement. Various motions can be used to capture image data with a camera or other capture device. Furthermore, unlike a stitched panorama, a MVIDMR can display different sides of the same object.

Figures 10A, 10B:
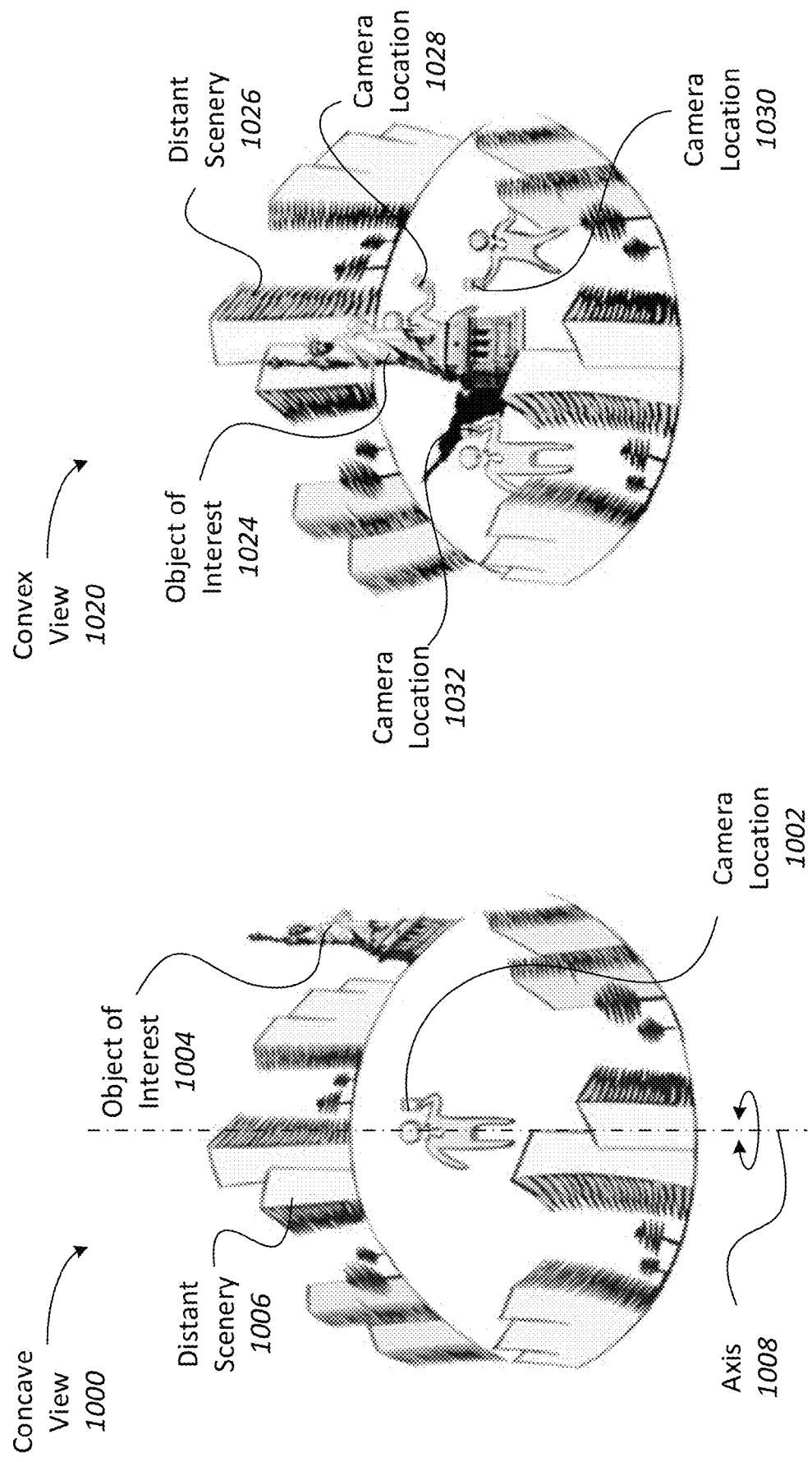
FIGS. 10A-10B illustrate examples of concave and convex views, where both views use a back-camera capture style.

FIGS. 10A-10B illustrate examples of concave and convex views, respectively, where both views use a back-camera capture style. In particular, if a camera phone is used, these views use the camera on the back of the phone, facing away from the user. In particular embodiments, concave and convex views can affect how the content and context are designated in a MVIDMR.

With reference to FIG. 10A, shown is one example of a concave view 1000 in which a user is standing along a vertical axis 1008. In this example, the user is holding a camera, such that camera location 1002 does not leave axis 1008 during image capture. However, as the user pivots about axis 1008, the camera captures a panoramic view of the scene around the user, forming a concave view. In this embodiment, the object of interest 1004 and the distant scenery 1006 are all viewed similarly because of the way in which the images are captured. In this example, all objects in the concave view appear at infinity, so the content is equal to the context according to this view.

With reference to FIG. 1013, shown is one example of a convex view 1020 in which a user changes position when capturing images of an object of interest 1024. In this example, the user moves around the object of interest 1024, taking pictures from different sides of the object of interest from camera locations 1028, 1030, and 1032. Each of the images obtained includes a view of the object of interest, and a background of the distant scenery 1026. In the present example, the object of interest 1024 represents the content, and the distant scenery 1026 represents the context in this convex view.

Figure 11A:
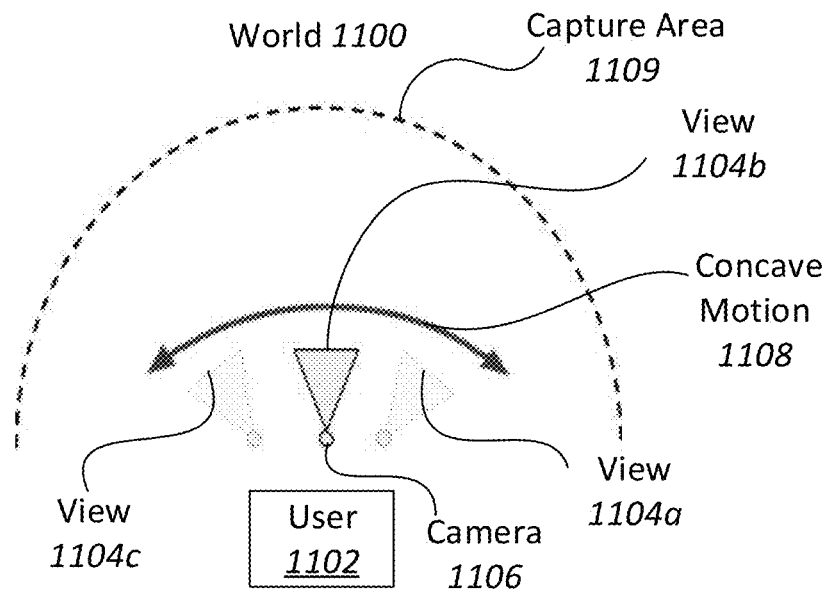
FIGS. 11A-11B illustrates one example of a back-facing, concave MVIDMR, generated in accordance with one or more embodiments.
Figure 11B:
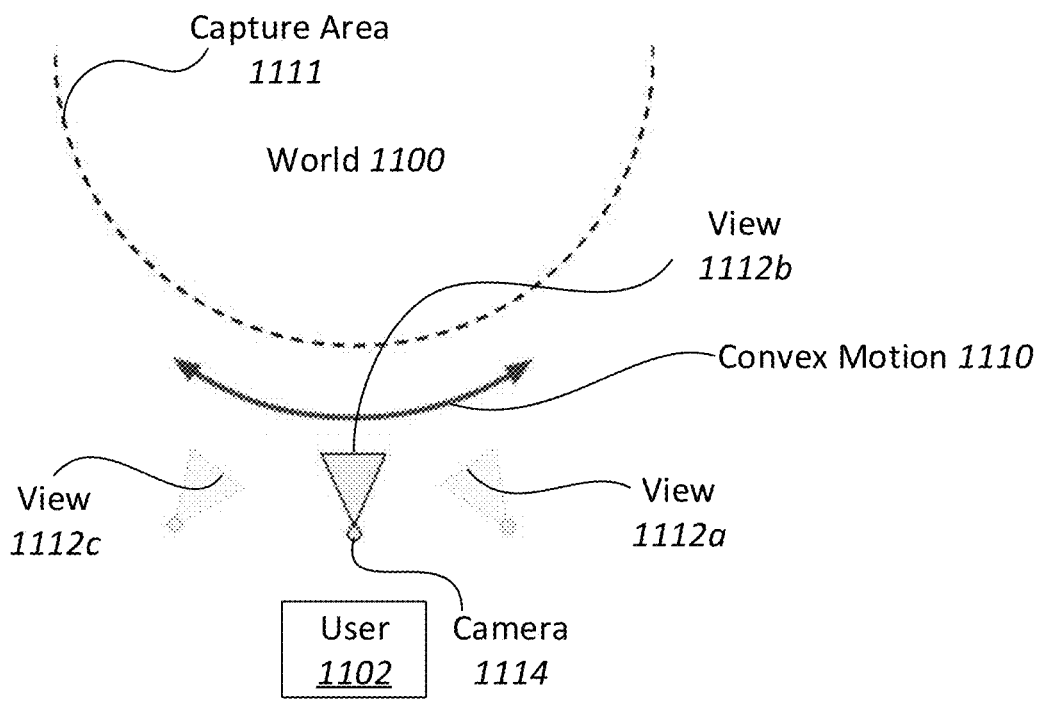

FIGS. 11A-11B illustrate examples of various capture modes for MVIDMRs. Although various motions can be used to capture a MVIDMR and are not constrained to any particular type of motion, three general types of motion can be used to capture particular features or views described in conjunction MVIDMRs. These three types of motion, respectively, can yield a locally concave MVIDMR, a locally convex MVIDMR, and a locally flat MVIDMR. In some embodiments, a MVIDMR can include various types of motions within the same MVIDMR.

With reference to FIG. 11A, shown is an example of a back-facing, concave MVIDMR being captured. According to various embodiments, a locally concave MVIDMR is one in which the viewing angles of the camera or other capture device diverge. In one dimension this can be likened to the motion required to capture a spherical 360 panorama (pure rotation), although the motion can be generalized to any curved sweeping motion in which the view faces outward. In the present example, the experience is that of a stationary viewer looking out at a (possibly dynamic) context.

In some embodiments, a user 1102 is using a back-facing camera 1106 to capture images towards world 1100, and away from user 1102. As described in various examples, a back-facing camera refers to a device with a camera that faces away from the user, such as the camera on the back of a smart phone. The camera is moved in a concave motion 1108, such that views 1104a, 1104b, and 1104c capture various parts of capture area 1109.

With reference to FIG. 11B, shown is an example of a back-facing, convex MVIDMR being captured. According to various embodiments, a locally convex MVIDMR is one in which viewing angles converge toward a single object of interest. In some embodiments, a locally convex MVIDMR can provide the experience of orbiting about a point, such that a viewer can see multiple sides of the same object. This object, which may be an "object of interest," can be segmented from the MVIDMR to become the content, and any surrounding data can be segmented to become the context. Previous technologies fail to recognize this type of viewing angle in the media-sharing landscape.

In some embodiments, a user 1102 is using a back-facing camera 1114 to capture images towards world 1100, and away from user 1102. The camera is moved in a convex motion 1110, such that views 1112a, 1112b, and 1112c capture various parts of capture area 1111. As described above, world 1100 can include an object of interest in some examples, and the convex motion 1110 can orbit around this object. Views 1112a, 1112b, and 1112c can include views of different sides of this object in these examples.

Figure 12A:
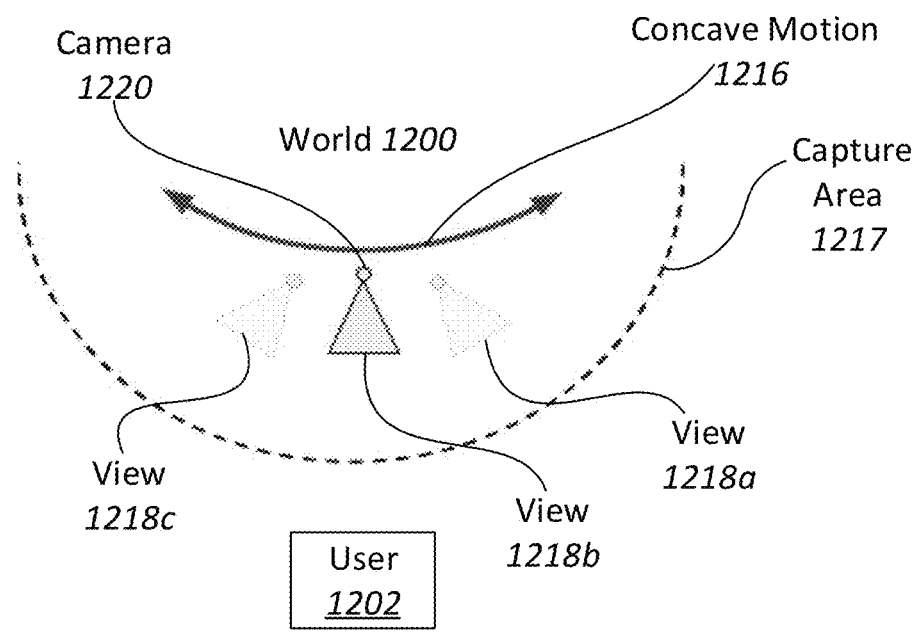
FIGS. 12A-12B illustrate examples of front-facing, concave and convex MVIDMRs generated in accordance with one or more embodiments.

With reference to FIG. 12A, shown is an example of a front-facing, concave MVIDMR being captured. As described in various examples, a front-facing camera refers to a device with a camera that faces towards the user, such as the camera on the front of a smart phone. For instance, front-facing cameras are commonly used to take "selfies" (i.e., self-portraits of the user).

In some embodiments, camera 1220 is facing user 1202. The camera follows a concave motion 1206 such that the views 1218a, 1218b, and 1218c diverge from each other in an angular sense. The capture area 1217 follows a concave shape that includes the user at a perimeter.

Figure 12B:
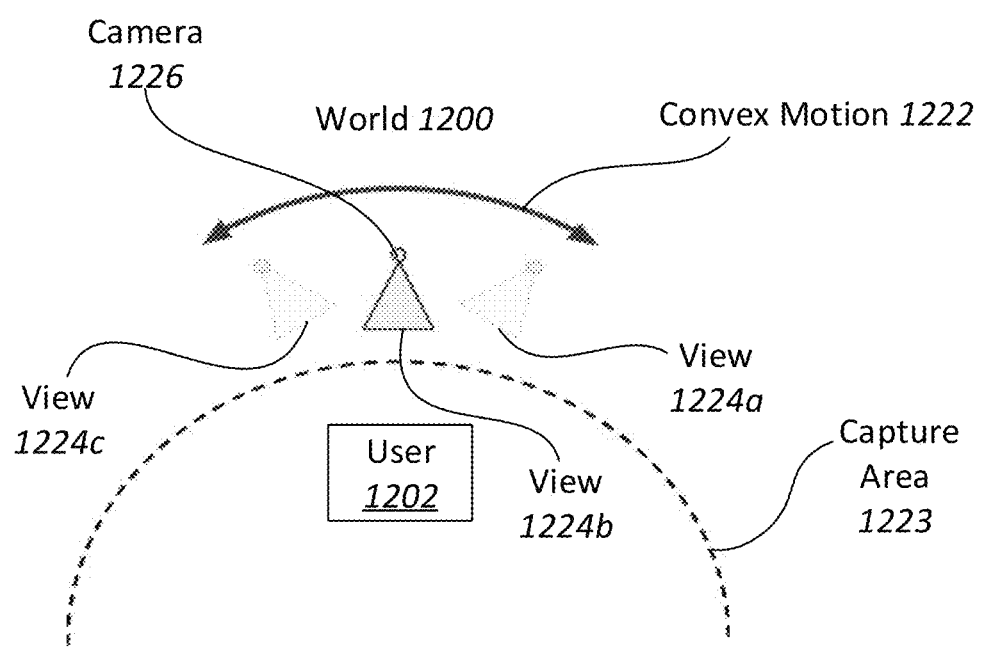

With reference to FIG. 12B, shown is an example of a front-facing, convex MVIDMR being captured. In some embodiments, camera 1226 is facing user 1202. The camera follows a convex motion 1222 such that the views 1224a, 1224b, and 1224c converge towards the user 1202. As described above, various modes can be used to capture images for a MVIDMR. These modes, including locally concave, locally convex, and locally linear motions, can be used during capture of separate images or during continuous recording of a scene. Such recording can capture a series of images during a single session.

In some embodiments, the augmented reality system can be implemented on a mobile device, such as a cell phone. In particular, the live camera data, which is output to a display on the mobile device, can be augmented with virtual objects. The virtual objects can be rendered into the live camera data. In some embodiments, the virtual objects can provide a user feedback when images are being captured for a MVIDMR.

Figure 13:
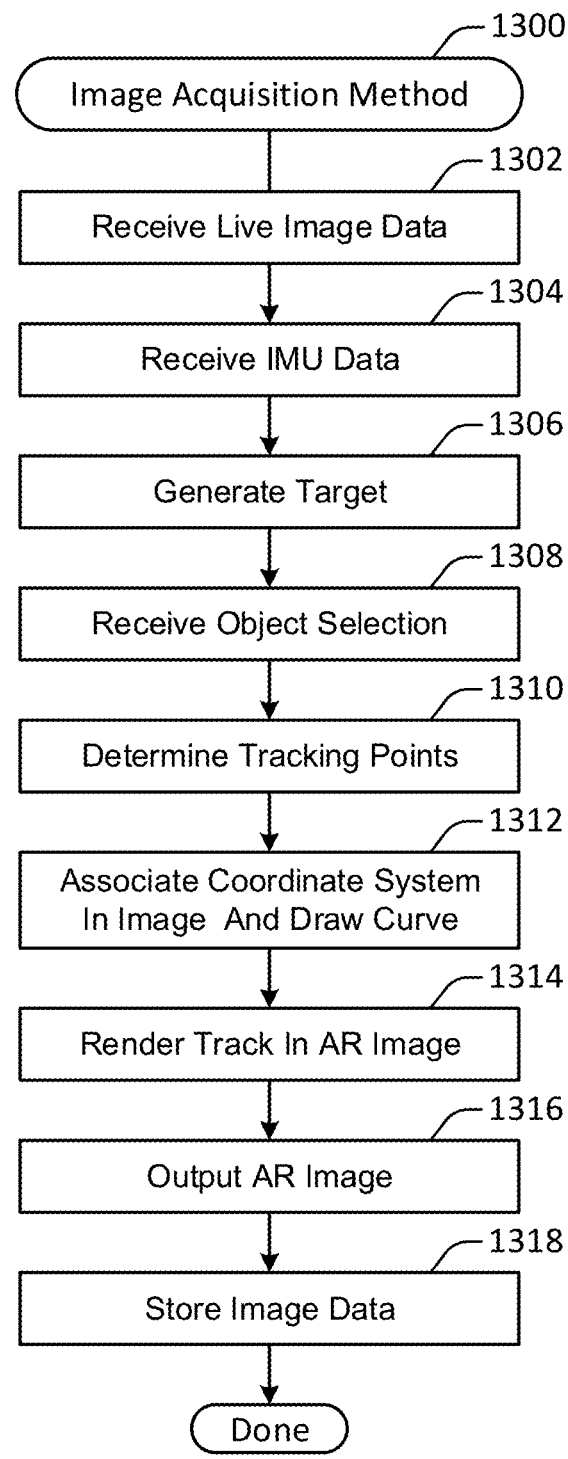
FIG. 13 illustrates one example of a method for generating virtual data associated with a target using live image data, performed in accordance with one or more embodiments.
Figure 14:
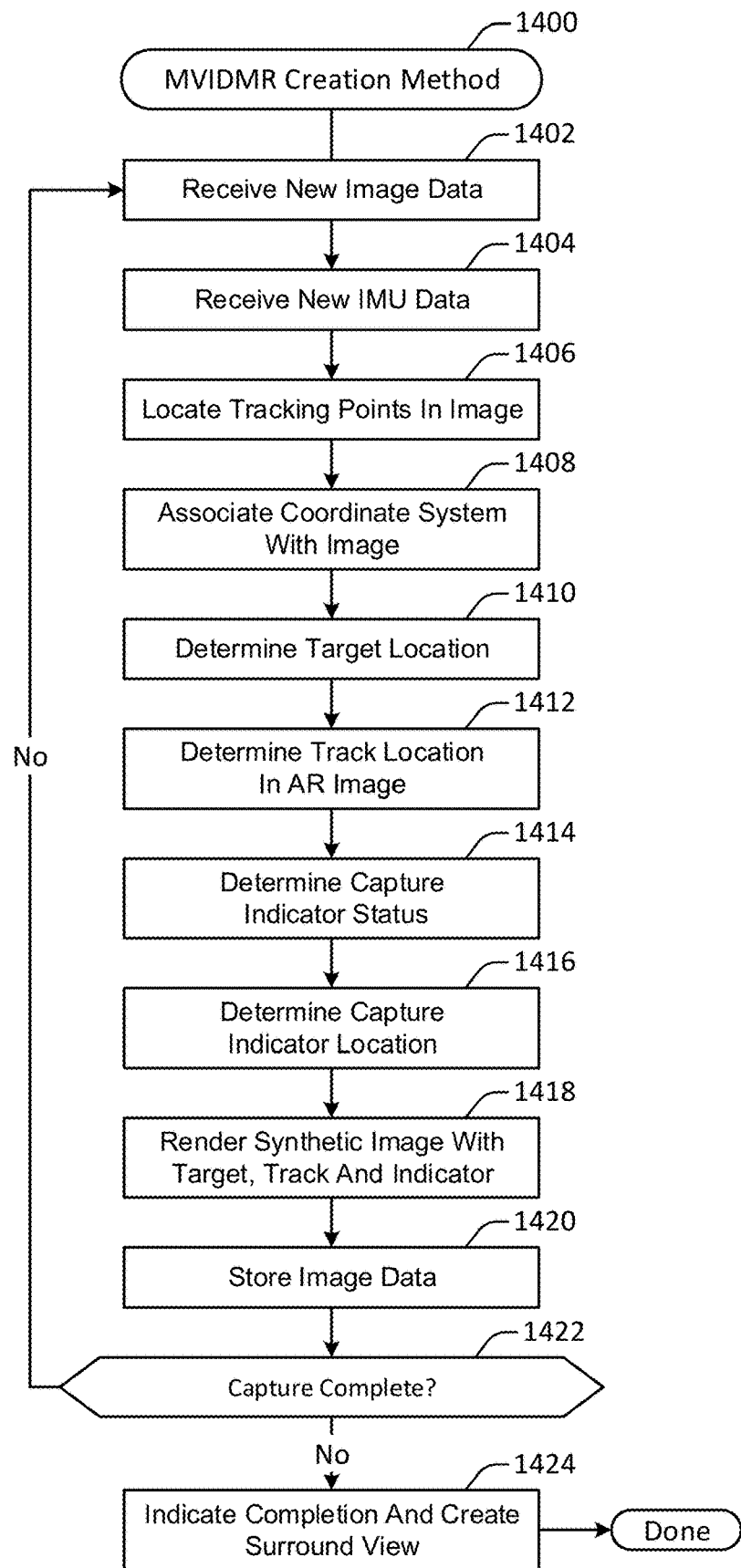
FIG. 14 illustrates one example of a method for generating MVIDMRs, performed in accordance with one or more embodiments.

FIGS. 13 and 14 illustrate an example of a process flow for capturing images in a MVIDMR using augmented reality. In 1302, live image data can be received from a camera system. For example, live image data can be received from one or more cameras on a hand-held mobile device, such as a smartphone. The image data can include pixel data captured from a camera sensor. The pixel data varies from frame to frame. In some embodiments, the pixel data can be 2-D. In other embodiments, depth data can be included with the pixel data. In 1304, sensor data can be received. For example, the mobile device can include an IMU with accelerometers and gyroscopes. The sensor data can be used to determine an orientation of the mobile device, such as a tilt orientation of the device relative to the gravity vector. Thus, the orientation of the live 2-D image data relative to the gravity vector can also be determined. In addition, when the user applied accelerations can be separated from the acceleration due to gravity, it may be possible to determine changes in position of the mobile device as a function of time.

In particular embodiments, a camera reference frame can be determined. In the camera reference frame, one axis is aligned with a line perpendicular to the camera lens. Using an accelerometer on the phone, the camera reference frame can be related to an Earth reference frame. The earth reference frame can provide a 3-D coordinate system where one of the axes is aligned with the Earths' gravitational vector. The relationship between the camera frame and Earth reference frame can be indicated as yaw, roll and tilt/pitch. Typically, at least two of the three of yaw, roll and pitch are available typically from sensors available on a mobile device, such as smart phone's gyroscopes and accelerometers.

The combination of yaw-roll-tilt information from the sensors, such as a smart phone or tablets accelerometers and the data from the camera including the pixel data can be used to relate the 2-D pixel arrangement in the camera field of view to the 3-D reference frame in the real world. In some embodiments, the 2-D pixel data for each picture can be translated to a reference frame as if the camera where resting on a horizontal plane perpendicular to an axis through the gravitational center of the Earth where a line drawn through the center of lens perpendicular to the surface of lens is mapped to a center of the pixel data. This reference frame can be referred as an Earth reference frame. Using this calibration of the pixel data, a curve or object defined in 3-D space in the earth reference frame can be mapped to a plane associated with the pixel data (2-D pixel data). If depth data is available, i.e., the distance of the camera to a pixel. Then, this information can also be utilized in a transformation.

In alternate embodiments, the 3-D reference frame in which an object is defined doesn't have to be an Earth reference frame. In some embodiments, a 3-D reference in which an object is drawn and then rendered into the 2-D pixel frame of reference can be defined relative to the Earth reference frame. In another embodiment, a 3-D reference frame can be defined relative to an object or surface identified in the pixel data and then the pixel data can be calibrated to this 3-D reference frame.

As an example, the object or surface can be defined by a number of tracking points identified in the pixel data. Then, as the camera moves, using the sensor data and a new position of the tracking points, a change in the orientation of the 3-D reference frame can be determined from frame to frame. This information can be used to render virtual data in a live image data and/or virtual data into a MVIDMR.

Returning to FIG. 13, in 1306, virtual data associated with a target can be generated in the live image data. For example, the target can be cross hairs. In general, the target can be rendered as any shape or combinations of shapes. In some embodiments, via an input interface, a user may be able to adjust a position of the target. For example, using a touch screen over a display on which the live image data is output, the user may be able to place the target at a particular location in the synthetic image. The synthetic image can include a combination of live image data rendered with one or more virtual objects.

For example, the target can be placed over an object that appears in the image, such as a face or a person. Then, the user can provide an additional input via an interface that indicates the target is in a desired location. For example, the user can tap the touch screen proximate to the location where the target appears on the display. Then, an object in the image below the target can be selected. As another example, a microphone in the interface can be used to receive voice commands which direct a position of the target in the image (e.g., move left, move right, etc.) and then confirm when the target is in a desired location (e.g., select target).

In some instances, object recognition can be available. Object recognition can identify possible objects in the image. Then, the live images can be augmented with a number of indicators, such as targets, which mark identified objects. For example, objects, such as people, parts of people (e.g., faces), cars, wheels, can be marked in the image. Via an interface, the person may be able to select one of the marked objects, such as via the touch screen interface. In another embodiment, the person may be able to provide a voice command to select an object. For example, the person may be to say something like "select face," or "select car."

In 1308, the object selection can be received. The object selection can be used to determine an area within the image data to identify tracking points. When the area in the image data is over a target, the tracking points can be associated with an object appearing in the live image data.

In 1310, tracking points can be identified which are related to the selected object. Once an object is selected, the tracking points on the object can be identified on a frame to frame basis. Thus, if the camera translates or changes orientation, the location of the tracking points in the new frame can be identified and the target can be rendered in the live images so that it appears to stay over the tracked object in the image. This feature is discussed in more detail below. In particular embodiments, object detection and/or recognition may be used for each or most frames, for instance to facilitate identifying the location of tracking points.

In some embodiments, tracking an object can refer to tracking one or more points from frame to frame in the 2-D image space. The one or more points can be associated with a region in the image. The one or more points or regions can be associated with an object. However, the object doesn't have to be identified in the image. For example, the boundaries of the object in 2-D image space don't have to be known. Further, the type of object doesn't have to be identified. For example, a determination doesn't have to be made as to whether the object is a car, a person or something else appearing in the pixel data. Instead, the one or more points may be tracked based on other image characteristics that appear in successive frames. For instance, edge tracking, corner tracking, or shape tracking may be used to track one or more points from frame to frame.

One advantage of tracking objects in the manner described in the 2-D image space is that a 3-D reconstruction of an object or objects appearing in an image don't have to be performed. The 3-D reconstruction step may involve operations such as "structure from motion (SFM)" and/or "simultaneous localization and mapping (SLAM)." The 3-D reconstruction can involve measuring points in multiple images, and the optimizing for the camera poses and the point locations. When this process is avoided, significant computation time is saved. For example, avoiding the SLAM/SFM computations can enable the methods to be applied when objects in the images are moving. Typically, SLAM/SFM computations assume static environments.

In 1312, a 3-D coordinate system in the physical world can be associated with the image, such as the Earth reference frame, which as described above can be related to camera reference frame associated with the 2-D pixel data. In some embodiments, the 2-D image data can be calibrated so that the associated 3-D coordinate system is anchored to the selected target such that the target is at the origin of the 3-D coordinate system.

Then, in 1314, a 2-D or 3-D trajectory or path can be defined in the 3-D coordinate system. For example, a trajectory or path, such as an arc or a parabola can be mapped to a drawing plane which is perpendicular to the gravity vector in the Earth reference frame. As described above, based upon the orientation of the camera, such as information provided from an IMU, the camera reference frame including the 2-D pixel data can be mapped to the Earth reference frame. The mapping can be used to render the curve defined in the 3-D coordinate system into the 2-D pixel data from the live image data. Then, a synthetic image including the live image data and the virtual object, which is the trajectory or path, can be output to a display.

In general, virtual objects, such as curves or surfaces can be defined in a 3-D coordinate system, such as the Earth reference frame or some other coordinate system related to an orientation of the camera. Then, the virtual objects can be rendered into the 2-D pixel data associated with the live image data to create a synthetic image. The synthetic image can be output to a display.

In some embodiments, the curves or surfaces can be associated with a 3-D model of an object, such as person or a car. In another embodiment, the curves or surfaces can be associated with text. Thus, a text message can be rendered into the live image data. In other embodiments, textures can be assigned to the surfaces in the 3-D model. When a synthetic image is created, these textures can be rendered into the 2-D pixel data associated with the live image data.

When a curve is rendered on a drawing plane in the 3-D coordinate system, such as the Earth reference frame, one or more of the determined tracking points can be projected onto the drawing plane. As another example, a centroid associated with the tracked points can be projected onto the drawing plane. Then, the curve can be defined relative to one or more points projected onto the drawing plane. For example, based upon the target location, a point can be determined on the drawing plane. Then, the point can be used as the center of a circle or arc of some radius drawn in the drawing plane.

In 1314, based upon the associated coordinate system, a curve can be rendered into to the live image data as part of the AR system. In general, one or more virtual objects including plurality of curves, lines or surfaces can be rendered into the live image data. Then, the synthetic image including the live image data and the virtual objects can be output to a display in real-time.

In some embodiments, the one or more virtual object rendered into the live image data can be used to help a user capture images used to create a MVIDMR. For example, the user can indicate a desire to create a MVIDMR of a real object identified in the live image data.

The desired MVIDMR can span some angle range, such as forty-five, ninety, one hundred eighty degrees or three hundred sixty degrees. Then, a virtual object can be rendered as a guide where the guide is inserted into the live image data. The guide can indicate a path along which to move the camera and the progress along the path. The insertion of the guide can involve modifying the pixel data in the live image data in accordance with coordinate system in 1312.

In the example above, the real object can be some object which appears in the live image data. For the real object, a 3-D model may not be constructed. Instead, pixel locations or pixel areas can be associated with the real object in the 2-D pixel data. This definition of the real object is much less computational expensive than attempting to construct a 3-D model of the real object in physical space.

The virtual objects, such as lines or surfaces can be modeled in the 3-D space. The virtual objects can be defined a priori. Thus, the shape of the virtual object doesn't have to be constructed in real-time, which is computational expensive. The real objects which may appear in an image are not known a priori. Hence, 3-D models of the real object are not typically available. Therefore, the synthetic image can include "real" objects which are only defined in the 2-D image space via assigning tracking points or areas to the real object and virtual objects which are modeled in a 3-D coordinate system and then rendered into the live image data.

Returning to FIG. 13, in 1316, AR image with one or more virtual objects can be output. The pixel data in the live image data can be received at a particular frame rate. In particular embodiments, the augmented frames can be output at the same frame rate as it received. In other embodiments, it can be output at a reduced frame rate. The reduced frame rate can lessen computation requirements. For example, live data received at 30 frames per second can be output at 15 frames per second. In another embodiment, the AR images can be output at a reduced resolution, such as 240p instead of 480p. The reduced resolution can also be used to reduce computational requirements.

In 1318, one or more images can be selected from the live image data and stored for use in a MVIDMR. In some embodiments, the stored images can include one or more virtual objects. Thus, the virtual objects can be become part of the MVIDMR. In other embodiments, the virtual objects are only output as part of the AR system. But, the image data which is stored for use in the MVIDMR may not include the virtual objects.

In yet other embodiments, a portion of the virtual objects output to the display as part of the AR system can be stored. For example, the AR system can be used to render a guide during the MVIDMR image capture process and render a label associated with the MVIDMR. The label may be stored in the image data for the MVIDMR. However, the guide may not be stored. To store the images without the added virtual objects, a copy may have to be made. The copy can be modified with the virtual data and then output to a display and the original stored or the original can be stored prior to its modification.

In FIG. 14, the method in FIG. 13 is continued. In 1422, new image data can be received. In 1424, new IMU data (or, in general sensor data) can be received. The IMU data can represent a current orientation of the camera. In 1426, the location of the tracking points identified in previous image data can be identified in the new image data.

The camera may have tilted and/or moved. Hence, the tracking points may appear at a different location in the pixel data. As described above, the tracking points can be used to define a real object appearing in the live image data. Thus, identifying the location of the tracking points in the new image data allows the real object to be tracked from image to image. The differences in IMU data from frame to frame and knowledge of the rate at which the frames are recorded can be used to help to determine a change in location of tracking points in the live image data from frame to frame.

The tracking points associated with a real object appearing in the live image data may change over time. As a camera moves around the real object, some tracking points identified on the real object may go out of view as new portions of the real object come into view and other portions of the real object are occluded. Thus, in 1426, a determination may be made whether a tracking point is still visible in an image. In addition, a determination may be made as to whether a new portion of the targeted object has come into view. New tracking points can be added to the new portion to allow for continued tracking of the real object from frame to frame.

In 1428, a coordinate system can be associated with the image. For example, using an orientation of the camera determined from the sensor data, the pixel data can be calibrated to an Earth reference frame as previously described. In 1430, based upon the tracking points currently placed on the object and the coordinate system a target location can be determined. The target can be placed over the real object which is tracked in live image data. As described above, a number and a location of the tracking points identified in an image can vary with time as the position of the camera changes relative to the camera. Thus, the location of the target in the 2-D pixel data can change. A virtual object representing the target can be rendered into the live image data. In particular embodiments, a coordinate system may be defined based on identifying a position from the tracking data and an orientation from the IMU (or other) data.

In 1432, a track location in the live image data can be determined. The track can be used to provide feedback associated with a position and orientation of a camera in physical space during the image capture process for a MVIDMR. As an example, as described above, the track can be rendered in a drawing plane which is perpendicular to the gravity vector, such as parallel to the ground. Further, the track can be rendered relative to a position of the target, which is a virtual object, placed over a real object appearing in the live image data. Thus, the track can appear to surround or partially surround the object. As described above, the position of the target can be determined from the current set of tracking points associated with the real object appearing in the image. The position of the target can be projected onto the selected drawing plane.

In 1434, a capture indicator status can be determined. The capture indicator can be used to provide feedback in regards to what portion of the image data used in a MVIDMR has been captured. For example, the status indicator may indicate that half of angle range of images for use in a MVIDMR has been captured. In another embodiment, the status indicator may be used to provide feedback in regards to whether the camera is following a desired path and maintaining a desired orientation in physical space. Thus, the status indicator may indicate the current path or orientation of the camera is desirable or not desirable. When the current path or orientation of the camera is not desirable, the status indicator may be configured to indicate what type of correction which is needed, such as but not limited to moving the camera more slowly, starting the capture process over, tilting the camera in a certain direction and/or translating the camera in a particular direction.

In 1436, a capture indicator location can be determined. The location can be used to render the capture indicator into the live image and generate the synthetic image. In some embodiments, the position of the capture indicator can be determined relative to a position of the real object in the image as indicated by the current set of tracking points, such as above and to left of the real object. In 1438, a synthetic image, i.e., a live image augmented with virtual objects, can be generated. The synthetic image can include the target, the track and one or more status indicators at their determined locations, respectively. In 1440, image data captured for the purposes of use in a MVIDMR can be captured. As described above, the stored image data can be raw image data without virtual objects or may include virtual objects.

In 1442, a check can be made as to whether images needed to generate a MVIDMR have been captured in accordance with the selected parameters, such as a MVIDMR spanning a desired angle range. When the capture is not complete, new image data may be received and the method may return to 1422. When the capture is complete, a virtual object can be rendered into the live image data indicating the completion of the capture process for the MVIDMR and a MVIDMR can be created. Some virtual objects associated with the capture process may cease to be rendered. For example, once the needed images have been captured the track used to help guide the camera during the capture process may no longer be generated in the live image data.

Figure 15A:
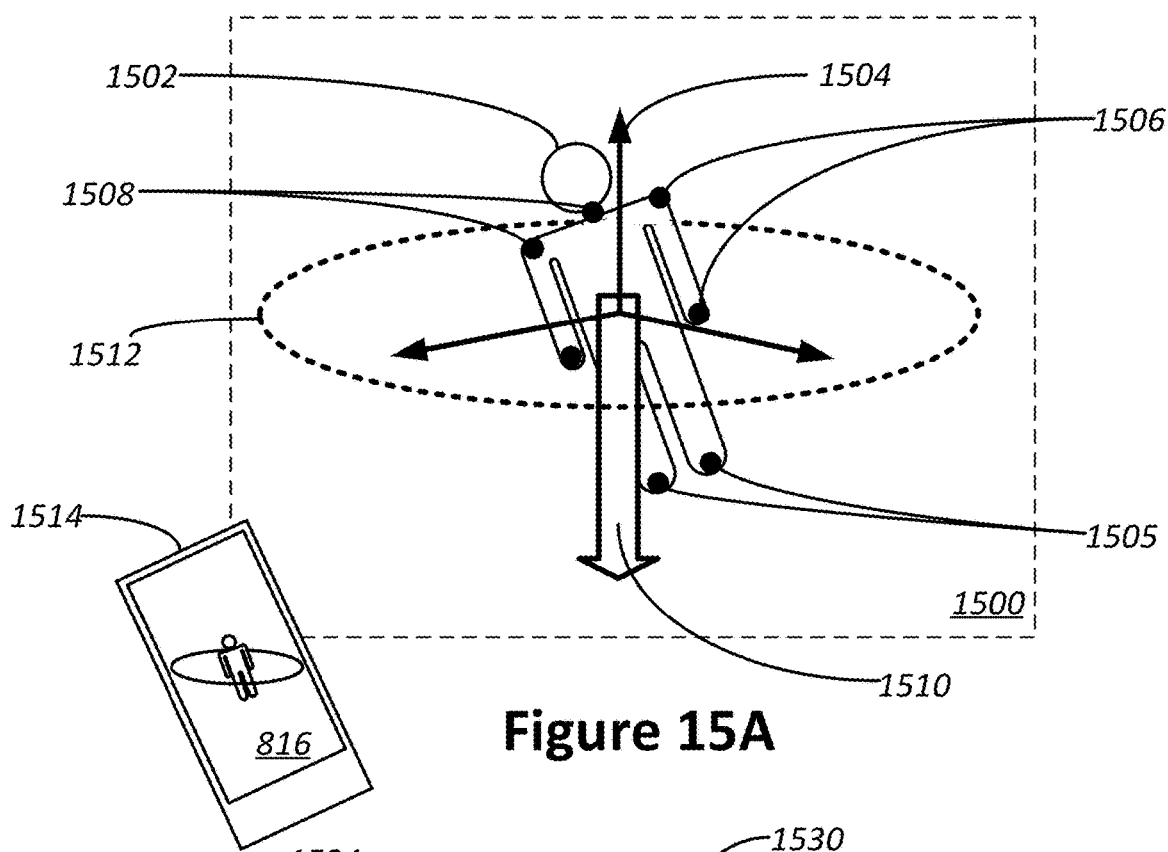
FIGS. 15A and 15B illustrate some aspects of generating an Augmented Reality (AR) image capture track for capturing images used in a MVIDMR.
Figure 15B:
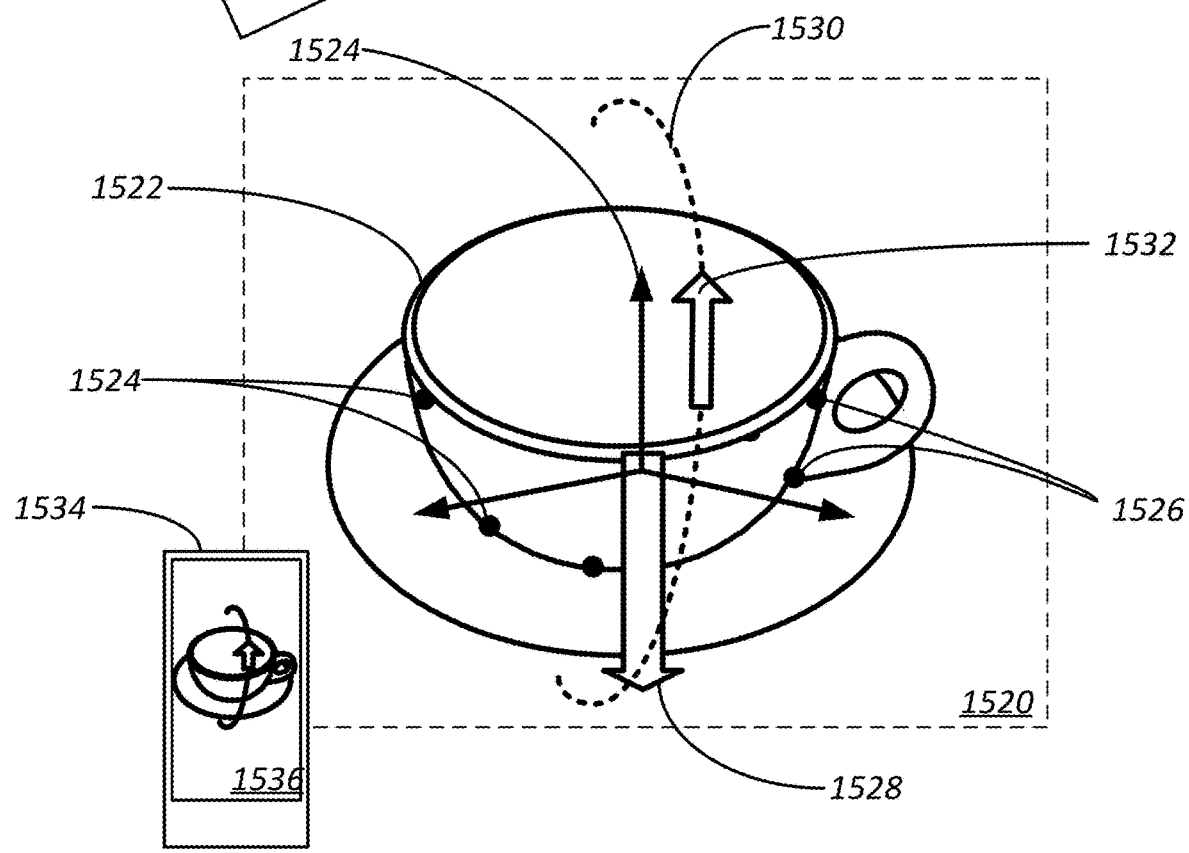

FIGS. 15A and 15B illustrate aspects of generating an Augmented Reality (AR) image capture track for capturing images used in a MVIDMR. In FIG. 15A, a mobile device 1514 with a display 1516 is shown. The mobile device can include at least one camera (not shown) with a field of view 1500. A real object 1502, which is a person, is selected in the field of view 1500 of the camera. A virtual object, which is a target (not shown), may have been used to help select the real object. For example, the target on a touch screen display of the mobile device 1514 may have been placed over the object 1502 and then selected.

The camera can include an image sensor which captures light in the field of view 1500. The data from the image sensor can be converted to pixel data. The pixel data can be modified prior to its output on display 1516 to generate a synthetic image. The modifications can include rendering virtual objects in the pixel data as part of an augmented reality (AR) system.

Using the pixel data and a selection of the object 1502, tracking points on the object can be determined. The tracking points can define the object in image space. Locations of a current set of tracking points, such as 1505, 1506 and 1508, which can be attached to the object 1502 are shown. As a position and orientation of the camera on the mobile device 1514, the shape and position of the object 1502 in the captured pixel data can change. Thus, the location of the tracking points in the pixel data can change. Thus, a previously defined tracking point can move from a first location in the image data to a second location. Also, a tracking point can disappear from the image as portions of the object are occluded.

Using sensor data from the mobile device 1514, an Earth reference frame 3-D coordinate system 1504 can be associated with the image data. The direction of the gravity vector is indicated by arrow 1510. As described above, in a particular embodiment, the 2-D image data can be calibrated relative to the Earth reference frame. The arrow representing the gravity vector is not rendered into the live image data. However, if desired, an indicator representative of the gravity could be rendered into the synthetic image.

A plane which is perpendicular to the gravity vector can be determined. The location of the plane can be determined using the tracking points in the image, such as 1505, 1506 and 1508. Using this information, a curve, which is a circle, is drawn in the plane. The circle can be rendered into to the 2-D image data and output as part of the AR system. As is shown on display 1516, the circle appears to surround the object 1502. In some embodiments, the circle can be used as a guide for capturing images used in a MVIDMR.

If the camera on the mobile device 1514 is rotated in some way, such as tilted, the shape of the object will change on display 1516. However, the new orientation of the camera can be determined in space including a direction of the gravity vector. Hence, a plane perpendicular to the gravity vector can be determined. The position of the plane and hence, a position of the curve in the image can be based upon a centroid of the object determined from the tracking points associated with the object 1502. Thus, the curve can appear to remain parallel to the ground, i.e., perpendicular to the gravity vector, as the camera 1514 moves. However, the position of the curve can move from location to location in the image as the position of the object and its apparent shape in the live images changes.

In FIG. 15B, a mobile device 1534 including a camera (not shown) and a display 1536 for outputting the image data from the camera is shown. A cup 1522 is shown in the field of view of camera 1520 of the camera. Tracking points, such as 1524 and 1526, have been associated with the object 1522. These tracking points can define the object 1522 in image space. Using the IMU data from the mobile device 1534, a reference frame has been associated with the image data. As described above, In some embodiments, the pixel data can be calibrated to the reference frame. The reference frame is indicated by the 3-D axes 1524 and the direction of the gravity vector is indicated by arrow 1528.

As described above, a plane relative to the reference frame can be determined. In this example, the plane is parallel to the direction of the axis associated with the gravity vector as opposed to perpendicular to the frame. This plane is used to proscribe a path for the MVIDMR which goes over the top of the object 1530. In general, any plane can be determined in the reference frame and then a curve, which is used as a guide, can be rendered into the selected plane.

Using the locations of the tracking points, In some embodiments, a centroid of the object 1522 on the selected plane in the reference can be determined. A curve 1530, such as a circle, can be rendered relative to the centroid. In this example, a circle is rendered around the object 1522 in the selected plane.

The curve 1530 can serve as a track for guiding the camera along a particular path where the images captured along the path can be converted into a MVIDMR. In some embodiments, a position of the camera along the path can be determined. Then, an indicator can be generated which indicates a current location of the camera along the path. In this example, current location is indicated by arrow 1532.

The position of the camera along the path may not directly map to physical space, i.e., the actual position of the camera in physical space doesn't have to be necessarily determined. For example, an angular change can be estimated from the IMU data and optionally the frame rate of the camera. The angular change can be mapped to a distance moved along the curve where the ratio of the distance moved along the path 1530 is not a one to one ratio with the distance moved in physical space. In another example, a total time to traverse the path 1530 can be estimated and then the length of time during which images have been recorded can be tracked. The ratio of the recording time to the total time can be used to indicate progress along the path 1530.

The path 1530, which is an arc, and arrow 1532 are rendered into the live image data as virtual objects in accordance with their positions in the 3-D coordinate system associated with the live 2-D image data. The cup 1522, the circle 1530 and the 1532 arrow are shown output to display 1536. The orientation of the curve 1530 and the arrow 1532 shown on display 1536 relative to the cup 1522 can change if the orientation of the camera is changed, such as if the camera is tilted.

In particular embodiments, a size of the object 1522 in the image data can be changed. For example, the size of the object can be made bigger or smaller by using a digital zoom. In another example, the size of the object can be made bigger or smaller by moving the camera, such as on mobile device 1534, closer or farther away from the object 1522.

When the size of the object changes, the distances between the tracking points can change, i.e., the pixel distances between the tracking points can increase or can decrease. The distance changes can be used to provide a scaling factor. In some embodiments, as the size of the object changes, the AR system can be configured to scale a size of the curve 1530 and/or arrow 1532. Thus, a size of the curve relative to the object can be maintained.

In another embodiment, a size of the curve can remain fixed. For example, a diameter of the curve can be related to a pixel height or width of the image, such as 150 percent of the pixel height or width. Thus, the object 1522 can appear to grow or shrink as a zoom is used or a position of the camera is changed. However, the size of curve 1530 in the image can remain relatively fixed.

Figure 16:
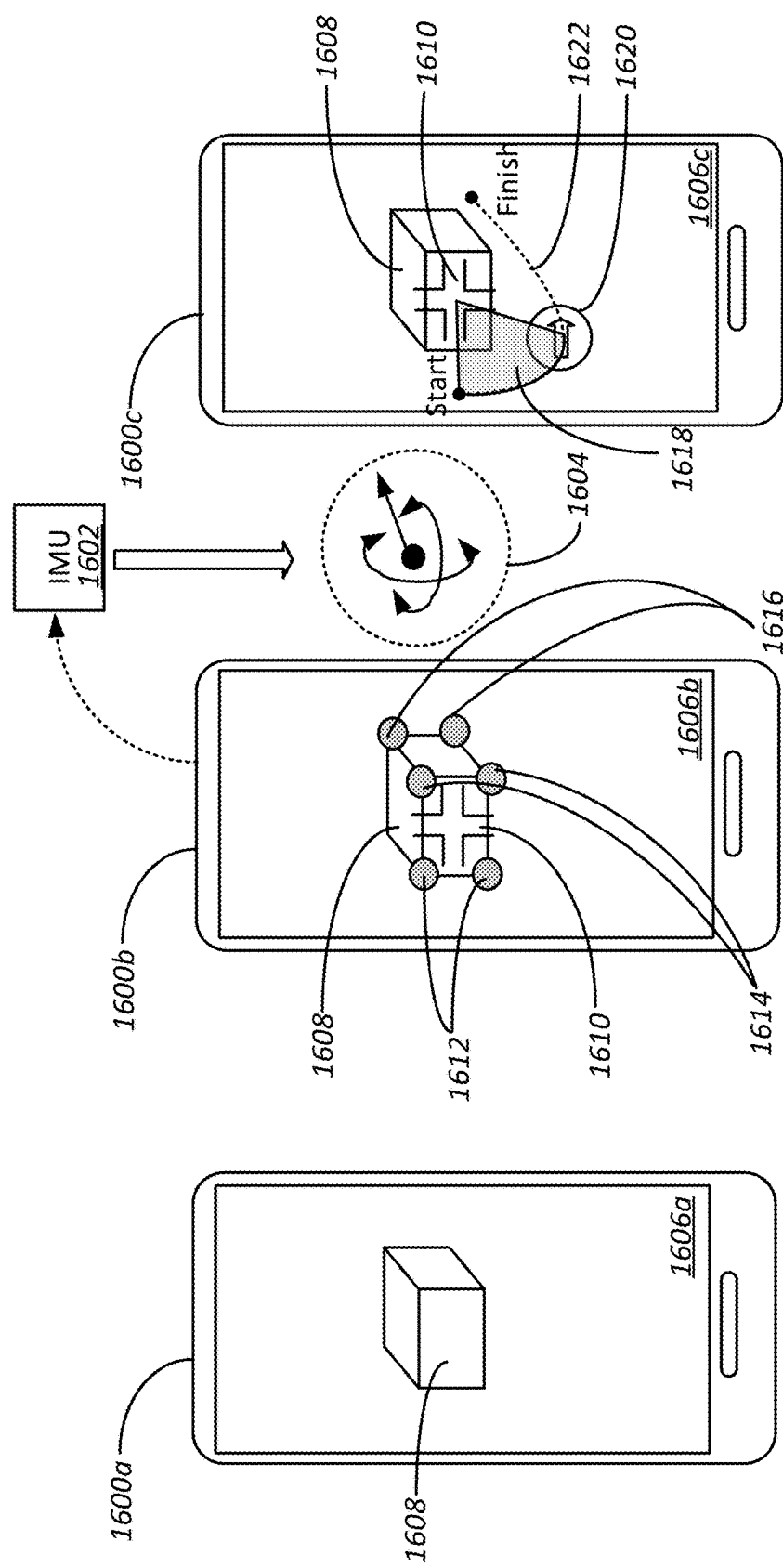
FIG. 16 illustrates one example of generating an Augmented Reality (AR) image capture track for capturing images used in a MVIDMR on a mobile device.

FIG. 16 illustrates a second example of generating an Augmented Reality (AR) image capture track for capturing images used in a MVIDMR on a mobile device. FIG. 16 includes a mobile device at three times 1600a, 1600b and 1600c. The device can include at least one camera, a display, an IMU, a processor (CPU), memory, microphone, audio output devices, communication interfaces, a power supply, graphic processor (GPU), graphical memory and combinations thereof. The display is shown with images at three times 1606a, 1606b and 1606c. The display can be overlaid with a touch screen.

In 1606a, an image of an object 1608 is output to the display in state 1606a. The object is a rectangular box. The image data output to the display can be live image data from a camera on the mobile device. The camera could also be a remote camera.

In some embodiments, a target, such as 1610, can be rendered to the display. The target can be combined with the live image data to create a synthetic image. Via the input interface on the phone, a user may be able to adjust a position of the target on the display. The target can be placed on an object and then an additional input can be made to select the object. For example, the touch screen can be tapped at the location of the target.

In another embodiment, object recognition can be applied to the live image data. Various markers can be rendered to the display, which indicate the position of the identified objects in the live image data. To select an object, the touchscreen can be tapped at a location of one of markers appearing in the image or another input device can be used to select the recognized object.

After an object is selected, a number of initial tracking points can be identified on the object, such as 1612, 1614 and 1616. In some embodiments, the tracking points may not appear on the display. In another embodiment, the tracking points may be rendered to the display. In some embodiments, if the tracking point is not located on the object of interest, the user may be able to select the tracking point and delete it or move it so that the tracking point lies on the object.

Next, an orientation of the mobile device can change. The orientation can include a rotation through one or more angles and translational motion as shown in 1604. The orientation change and current orientation of the device can be captured via the IMU data from IMU 1602 on the device.

As the orientation of the device is changed, one or more of the tracking points, such as 1612, 1614 and 1616, can be occluded. In addition, the shape of surfaces currently appearing in the image can change. Based on changes between frames, movement at various pixel locations can be determined. Using the IMU data and the determined movement at the various pixel locations, surfaces associated with the object 1608 can be predicted. The new surfaces can be appearing in the image as the position of the camera changes. New tracking points can be added to these surfaces.

As described above, the mobile device can be used to capture images used in a MVIDMR. To aid in the capture, the live image data can be augmented with a track or other guides to help the user move the mobile device correctly. The track can include indicators that provide feedback to a user while images associated with a MVIDMR are being recorded. In 1606*c*, the live image data is augmented with a path 1622. The beginning and end of the path is indicated by the text, "start" and "finish." The distance along the path is indicated by shaded region 1618.

The circle with the arrow 1620 is used to indicate a location on the path. In some embodiments, the position of the arrow relative to the path can change. For example, the arrow can move above or below the path or point in a direction which is not aligned with the path. The arrow can be rendered in this way when it is determined the orientation of the camera relative to the object or position of the camera diverges from a path that is desirable for generating the MVIDMR. Colors or other indicators can be used to indicate the status. For example, the arrow and/or circle can be rendered green when the mobile device is properly following the path and red when the position/orientation of the camera relative to the object is less than optimal.

Figure 17A:
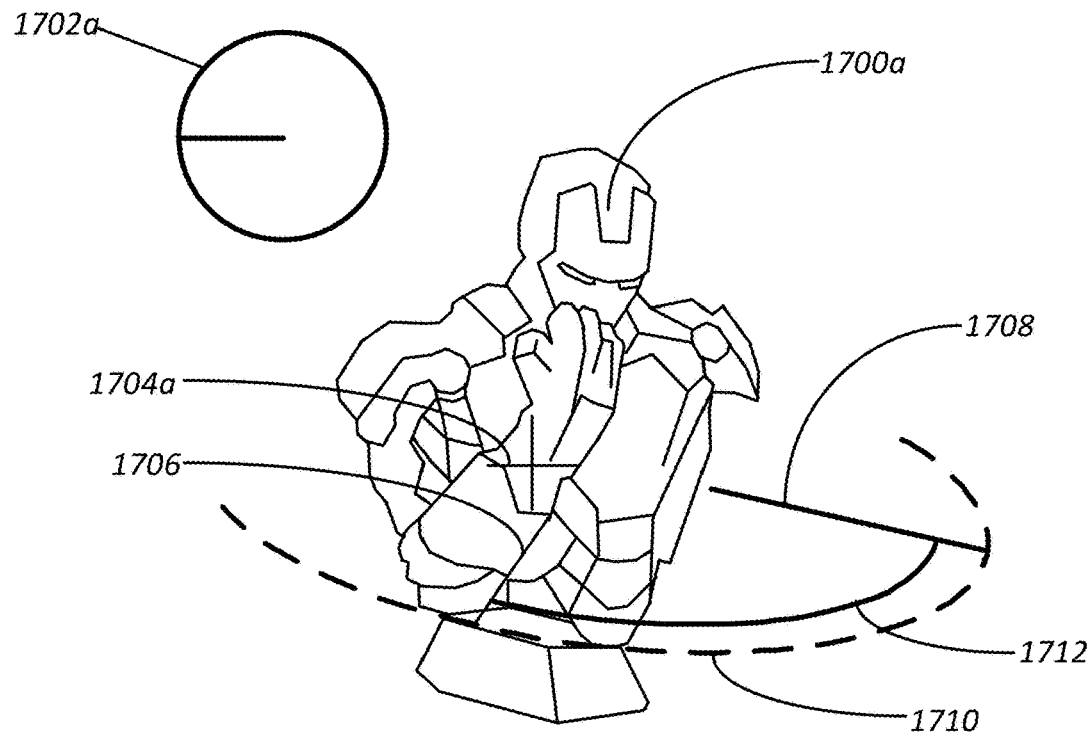
FIGS. 17A and 17B illustrate examples of generating an Augmented Reality (AR) image capture track including status indicators for capturing images used in a MVIDMR.
Figure 17B:
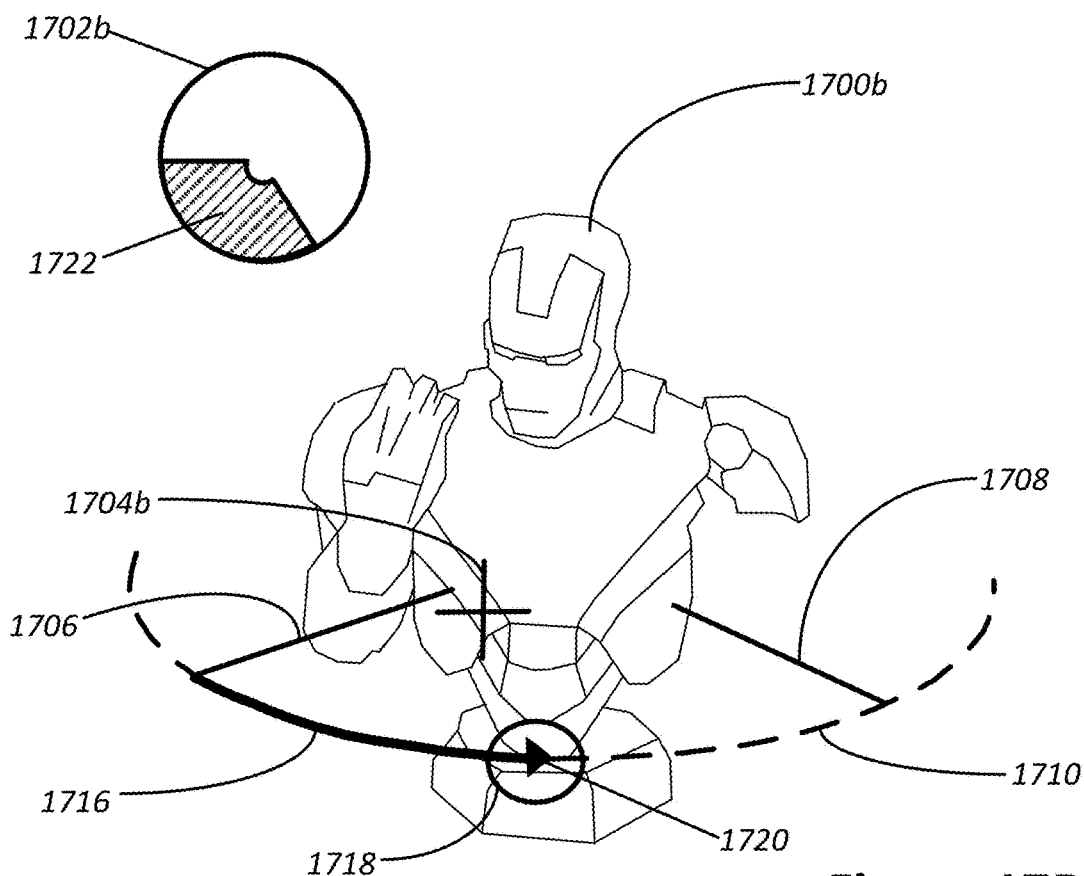

FIGS. 17A and 17B illustrate yet another example of generating an Augmented Reality (AR) image capture track including status indicators for capturing images used in a MVIDMR. The synthetic image generated by the AR system can consist of live image data from a camera augmented with one or more virtual objects. For example, as described above, the live image data can be from a camera on a mobile device.

In FIG. 17A, an object 1700*a*, which is a statue, is shown in an image 1715 from a camera at a first position and orientation. The object 1700*a* can be selected via the cross hairs 1704*a*. Once the cross hairs are placed on the object and the object is selected, the cross hairs can move and remain on the object as the object 1700*a* moves in the image data. As described above, as an object's position/orientation changes in an image, a location to place the cross hairs in an image can be determined. In some embodiments, the position of the cross hairs can be determined via tracking the movements of points in the image, i.e., the tracking points. In particular embodiments, if another object is moved in front of a tracked object, it may not be possible to associate the target 1704*a* with the object. For example, if a person moves in front of the camera, a hand is passed in front of the camera or the camera is moved so the object no longer appears in the camera field of view, then the object which is being tracked will no longer be visible. Hence, it may not be possible to determine a location for the target associated with the tracked object. In the instance where the object reappears in the image, such as if a person that blocked the view of the object moved into and out of the view, then the system can be configured to reacquire the tracking points and reposition the target.

A first virtual object is rendered as indicator 1702*a*. Indicator 1702*a* can be used to indicate the progress in capturing images for a MVIDMR. A second virtual object is rendered as curve 1710. Third and fourth virtual objects are rendered as lines 1706 and 1708. A fifth virtual object is rendered as curve 1712.

The curve 1710 can be used to depict a path of a camera. Whereas lines 1706 and 1708 and curve 1712 can be used to indicate an angle range for the MVIDMR. In this example, the angle range is about ninety degrees.

In FIG. 17B, the position of the camera is different as compared to FIG. 17A. Hence, a different view of object 1700*b* is presented in image 1725. In particular, the camera view shows more of the front of the object as compared to the view in FIG. 17A. The target 1704*b* is still affixed to the object 1700*b*. However, the target is fixed in a different location on the object, i.e., on a front surface as opposed to an arm.

The curve 1716 with arrow 1720 at the end is used to indicate the progress of the image capture along curve 1710. The circle 1718 around the arrow 1720 further highlights the current position of the arrow. As described above, a position and a direction of the arrow 1720 can be used to provide feedback to a user on a deviation of the camera position and/or orientation from curve 1710. Based upon this information, the user may adjust a position and/or orientation of the camera while it is capturing the image data.

Lines 1706 and 1708 still appear in the image but are positioned differently relative to object 1700*b*. The lines again indicate an angle range. In 1720, the arrow is about half way between lines 1706 and 1708. Hence, an angle of about 45 degrees has been captured around the object 1700*b*.

The indicator 1702*b* now includes a shaded region 1722. The shaded region can indicate a portion of a MVIDMR angle range currently captured. In some embodiments, lines 1706 and 1708 can only indicate a portion of the angle range in a MVIDMR that is being captured and the total angle range can be shown via indicator 1702*b*. In this example, the angle range shown by indicator 1702*b* is three hundred sixty degrees while lines 1706 and 1708 show a portion of this range which ninety degrees.

Figure 18:
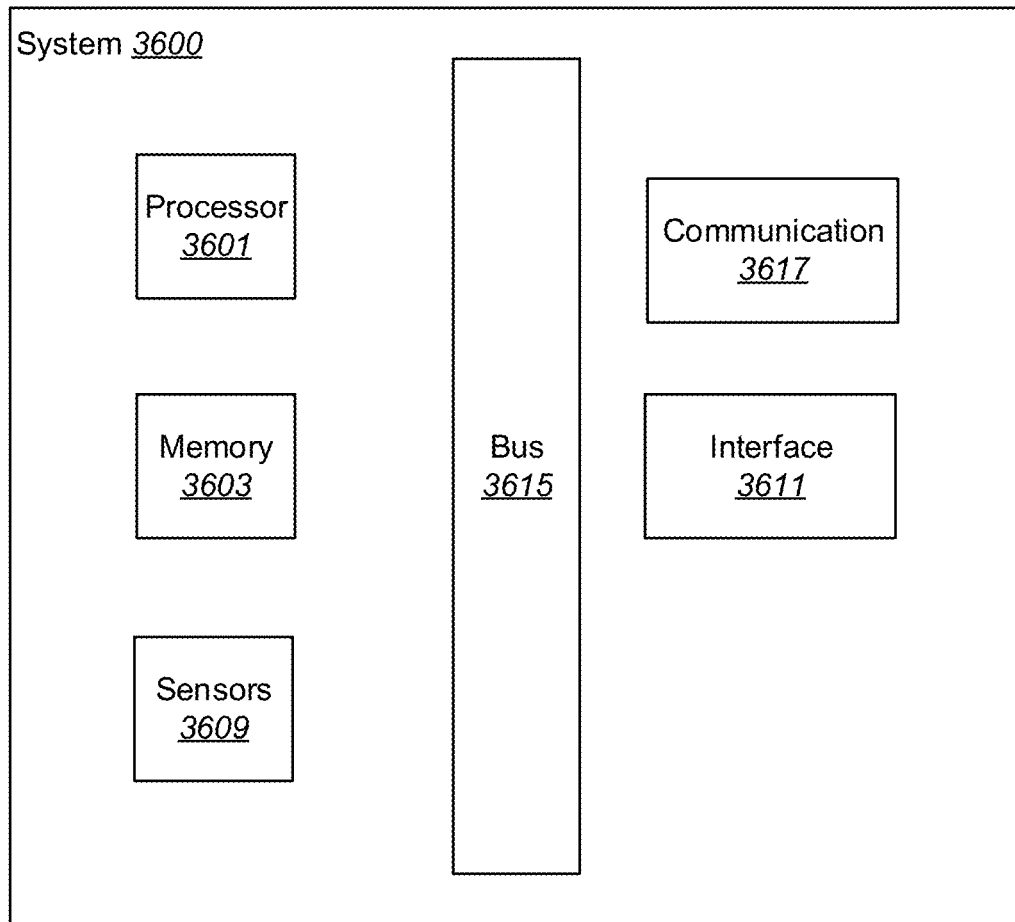
FIG. 18 illustrates a particular example of a computer system configured in accordance with various embodiments.

With reference to FIG. 18, shown is a particular example of a computer system that can be used to implement particular examples. For instance, the computer system 1800 can be used to provide MVIDMRs according to various embodiments described above. According to various embodiments, a system 1800 suitable for implementing particular embodiments includes a processor 1801, a memory 1803, an interface 1811, and a bus 1815 (e.g., a PCI bus).

The system 1800 can include one or more sensors, such as light sensors, accelerometers, gyroscopes, microphones, cameras including stereoscopic or structured light cameras. As described above, the accelerometers and gyroscopes may be incorporated in an IMU. The sensors can be used to detect movement of a device and determine a position of the device. Further, the sensors can be used to provide inputs into the system. For example, a microphone can be used to detect a sound or input a voice command.

In the instance of the sensors including one or more cameras, the camera system can be configured to output native video data as a live video feed. The live video feed can be augmented and then output to a display, such as a display on a mobile device. The native video can include a series of frames as a function of time. The frame rate is often described as frames per second (fps). Each video frame can be an array of pixels with color or gray scale values for each pixel. For example, a pixel array size can be 512 by 512 pixels with three color values (red, green and blue) per pixel. The three-color values can be represented by varying amounts of bits, such as 24, 30, 36, 40 bits, etc. per pixel. When more bits are assigned to representing the RGB color values for each pixel, a larger number of colors values are possible. However, the data associated with each image also increases. The number of possible colors can be referred to as the color depth.

The video frames in the live video feed can be communicated to an image processing system that includes hardware and software components. The image processing system can include non-persistent memory, such as random-access memory (RAM) and video RAM (VRAM). In addition, processors, such as central processing units (CPUs) and graphical processing units (GPUs) for operating on video data and communication busses and interfaces for transporting video data can be provided. Further, hardware and/or software for performing transformations on the video data in a live video feed can be provided.

In particular embodiments, the video transformation components can include specialized hardware elements configured to perform functions necessary to generate a synthetic image derived from the native video data and then augmented with virtual data. In data encryption, specialized hardware elements can be used to perform a specific data transformation, i.e., data encryption associated with a specific algorithm. In a similar manner, specialized hardware elements can be provided to perform all or a portion of a specific video data transformation. These video transformation components can be separate from the GPU(s), which are specialized hardware elements configured to perform graphical operations. All or a portion of the specific transformation on a video frame can also be performed using software executed by the CPU.

The processing system can be configured to receive a video frame with first RGB values at each pixel location and apply operation to determine second RGB values at each pixel location. The second RGB values can be associated with a transformed video frame which includes synthetic data. After the synthetic image is generated, the native video frame and/or the synthetic image can be sent to a persistent memory, such as a flash memory or a hard drive, for storage. In addition, the synthetic image and/or native video data can be sent to a frame buffer for output on a display or displays associated with an output interface. For example, the display can be the display on a mobile device or a view finder on a camera.

In general, the video transformations used to generate synthetic images can be applied to the native video data at its native resolution or at a different resolution. For example, the native video data can be a 512 by 512 array with RGB values represented by 24 bits and at frame rate of 24 fps. In some embodiments, the video transformation can involve operating on the video data in its native resolution and outputting the transformed video data at the native frame rate at its native resolution.

In other embodiments, to speed up the process, the video transformations may involve operating on video data and outputting transformed video data at resolutions, color depths and/or frame rates different than the native resolutions. For example, the native video data can be at a first video frame rate, such as 24 fps. But, the video transformations can be performed on every other frame and synthetic images can be output at a frame rate of 12 fps. Alternatively, the transformed video data can be interpolated from the 12 fps rate to 24 fps rate by interpolating between two of the transformed video frames.

In another example, prior to performing the video transformations, the resolution of the native video data can be reduced. For example, when the native resolution is 512 by 512 pixels, it can be interpolated to a 256 by 256 pixel array using a method such as pixel averaging and then the transformation can be applied to the 256 by 256 array. The transformed video data can output and/or stored at the lower 256 by 256 resolution. Alternatively, the transformed video data, such as with a 256 by 256 resolution, can be interpolated to a higher resolution, such as its native resolution of 512 by 512, prior to output to the display and/or storage. The coarsening of the native video data prior to applying the video transformation can be used alone or in conjunction with a coarser frame rate.

As mentioned above, the native video data can also have a color depth. The color depth can also be coarsened prior to applying the transformations to the video data. For example, the color depth might be reduced from 40 bits to 24 bits prior to applying the transformation.

As described above, native video data from a live video can be augmented with virtual data to create synthetic images and then output in real-time. In particular embodiments, real-time can be associated with a certain amount of latency, i.e., the time between when the native video data is captured and the time when the synthetic images including portions of the native video data and virtual data are output. In particular, the latency can be less than 100 milliseconds. In other embodiments, the latency can be less than 50 milliseconds. In other embodiments, the latency can be less than 30 milliseconds. In yet other embodiments, the latency can be less than 20 milliseconds. In yet other embodiments, the latency can be less than 10 milliseconds.

The interface 1811 may include separate input and output interfaces, or may be a unified interface supporting both operations. Examples of input and output interfaces can include displays, audio devices, cameras, touch screens, buttons and microphones. When acting under the control of appropriate software or firmware, the processor 1801 is responsible for such tasks such as optimization. Various specially configured devices can also be used in place of a processor 1801 or in addition to processor 1801, such as graphical processor units (GPUs). The complete implementation can also be done in custom hardware. The interface 1811 is typically configured to send and receive data packets or data segments over a network via one or more communication interfaces, such as wireless or wired communication interfaces. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to various embodiments, the system 1800 uses memory 1803 to store data and program instructions and maintained a local side cache. The program instructions may control the operation of an operating system and/or one or more applications, for example. The memory or memories may also be configured to store received metadata and batch requested metadata.

The system 1800 can be integrated into a single device with a common housing. For example, system 1800 can include a camera system, processing system, frame buffer, persistent memory, output interface, input interface and communication interface. In various embodiments, the single device can be a mobile device like a smart phone, an augmented reality and wearable device like Google Glass™ or a virtual reality head set that includes a multiple cameras, like a Microsoft Hololens™. In other embodiments, the system 1800 can be partially integrated. For example, the camera system can be a remote camera system. As another example, the display can be separate from the rest of the components like on a desktop PC.

In the case of a wearable system, like a head-mounted display, as described above, a virtual guide can be provided to help a user record a MVIDMR. In addition, a virtual guide can be provided to help teach a user how to view a MVIDMR in the wearable system. For example, the virtual guide can be provided in synthetic images output to head mounted display which indicate that the MVIDMR can be viewed from different angles in response to the user moving some manner in physical space, such as walking around the projected image. As another example, the virtual guide can be used to indicate a head motion of the user can allow for different viewing functions. In yet another example, a virtual guide might indicate a path that a hand could travel in front of the display to instantiate different viewing functions.

FIG. 19 illustrates a method 1900 of determining an orientation of an object, performed in accordance with one or more embodiments. The method 1900 may be performed on any suitable computing device. For example, the method 1900 may be performed on a mobile computing device such as a smartphone. Alternately or additionally, the method 1900 may be performed on a remote server in communication with a mobile computing device.

A request to determine an orientation of an object is received at 1902. According to various embodiments, the request may be received at a user interface. For example, the request may be received via an application at a mobile computing device. As another example, the request may be received at a user interface at a laptop.

At 1904, an image of the object is selected for analysis. According to various embodiments, the image may be a single two-dimensional image of the object. Alternately or additionally, the image may be one of a series of two-dimensional images of the object captured from different viewpoints. In some implementations, the image may be a single frame of a video stream of the object. In some embodiments, the image may be a 360-degree multi-view capture of the object. Alternately, the image may include a view that has less than 360-degree coverage.

Optionally, a bounding box for the object is determined at 1906. According to various embodiments, a bounding box for the object may include coordinates of a rectangular or non-rectangular border that encloses the object in the selected image. The bounding box may be determined by a neural network. For example, a neural network may be trained to determine the coordinates of the visible object pixels in an image of the object. The neural network may facilitate the determination of the pixel coordinates and the width, height, or other characteristics of the bounding box enclosing the object. Alternately or additionally, the bounding box may be determined by a different type of algorithm. In some configurations, the bounding box may be determined at least in part based on user input. For example, the bounding box may be determined by a user super-imposing a border on the image to enclose the object. In another example, the bounding box may be determined by the user tapping on the object with an algorithm automatically estimating the extent of the bounding based on the selection. In yet another example, the user may select points or regions in the foreground and background, and an algorithm automatically separates both to estimate the extent of a corresponding bounding box.

At 1908, an estimated object orientation is determined. According to various embodiments, the estimated object orientation may be determined by a neural network. For example, a neural network may be trained to determine the estimated object orientation through an analysis of the object from one or more images of an object. The estimated object orientation may include estimates about an object's roll, elevation, angular position, attitude, and azimuth angle.

An estimated camera orientation is identified at 1910. According to various embodiments, camera orientation may be estimated from data collected from an inertial measurement unit (IMU). In some implementations, the IMU may be associated with a mobile computing device, such as a smartphone. For example, a mobile computing device may include sensors such as a camera capable of capturing visual data such as an image or video stream. A mobile computing device may also include an accelerometer, a gyroscope, and other such sensors capable of capturing IMU data. IMU data may include information such as camera location, camera angle, device velocity, device acceleration, or any of a wide variety of data collected from accelerometers or other such sensors.

In some implementations, IMU orientation may identify orientation information associated with the camera. The IMU orientation may then be used to infer orientation information about the object. For example, the IMU orientation may indicate that the image was captured with a camera located at a particular height and angle relative to the object and/or ground. Alternatively, or additionally, the orientation estimation might be done using a pose estimation algorithm based on image data. In some configurations, the pose estimation method might also consider the available IMU data.

At 1912, an offset is determined between the estimated object orientation and the estimated camera orientation. According to various embodiments, the determination may be made at least in part by identifying a difference between the two values. Alternately, or additionally, the determination may be made at least in part by refining the object orientation based on additional information characterizing the position and angle of the camera.

A determination is made at 1914 as to whether to select an additional image of the object for analysis. In some implementations, additional images may be selected until all available images have been analyzed. For example, each image associated with a multi-view capture may be analyzed. If multiple images have been processed, then a combined offset may be to be calculated. For example, the offset can be averaged from the results obtained from multiple images. In another example, a robust method for estimating the final offset from multiple computed offsets might be used, for instance to handle outliers such as an inaccurate orientation estimation for certain images.

In some embodiments, the determination made at 1914 may be made at least in part automatically. For example, the estimated object orientation procedure at 1908 may attempt to estimate an orientation for the object, but may fail due to incomplete image information or other information. A determination may be automatically made to prompt the user to capture or upload additional images of the object.

In some implementations, the determination made at 1914 may be made at least in part as a request by a user. For example, a user may be prompted to select an additional image for analysis. Alternately or additionally, a user may be prompted to review an estimated object orientation, and a user may review the estimated object orientation and may elect to analyze additional images of the object in order to improve the accuracy or quality of the estimated object orientation. In some implementations, every N-th frame of the multi-view capture might be processed.

At 1916, the orientation estimation information is stored. According to various embodiments, storing the orientation estimation information may involve storing one or more orientation values for each of the images analyzed in FIG. 19. For example, orientation information may be stored to supplement a multi-view capture.

In some implementations, the orientation estimation may be stored on a storage device. Alternately, or additionally, the orientation estimation may be transmitted to a remote location via a network.

According to various embodiments, one or more operations shown in FIG. 19 may be omitted. For example, any or all of operations 1910 and 1912 may be omitted.

FIG. 20 illustrates a method for determining an object orientation based on 3D data. The method 2000 may be performed on any suitable computing device. For example, the method 2000 may be performed on a mobile computing device such as a smartphone. Alternately or additionally, the method 2000 may be performed on a remote server in communication with a mobile computing device.

A request to determine an orientation of an object is received at 2002. In some implementations, the request may be received at a user interface. At 2004, image information for the object is captured. In some implementations, the image information may include a video or image set of the object is captured from multiple perspectives. The image information may include a 360-degree view of the object. Alternately, the image information may include a view that has less than 360-degree coverage.

An object is identified for analysis at 2006. In some embodiments, the object may be identified via an algorithm. For example, the object may be identified via an image recognition algorithm. As another example, the object may be identified via a bounding box algorithm. In some implementations, the object may be identified based at least in part on user input. For instance, a user may identify the object as a vehicle via a user interface component such as a drop-down menu.

At 2008, one or more points of reference are identified on the object. According to various embodiments, points of reference may include one or more fiducial points on the object. Fiducial points are identifiable locations on objects of a particular type that in general should be present on all or nearly all objects of that type and that provide an indication as to the object's orientation. For example, in the case of a vehicle, fiducial points may include but are not limited to the vehicle's headlights, rearview mirror, and wheels.

In some implementations, the reference points may be identified via an algorithm, such as an image recognition algorithm. Alternately or additionally, reference points may be identified in part through user input.

A sparse 3D mesh of an object is determined at 2010. According to various embodiments, the sparse 3D mesh may be determined by using the fiducial points identified in operation 2008 as vertices of the mesh. For example, each face of the mesh may approximate the object shape with a planar surface.

At 2012, a 3D representation of the object is determined. According to various embodiments, the 3D representation may be constructed by elevating the fiducial points to 3D space and constructing a sparse 3D mesh from their locations. Alternately, or additionally, the object's orientation may be inferred based on cues such as surface normal of the faces of the mesh, visibility states of the fiducial points in a plurality of image, or other such features.

In some embodiments, the elevation into 3D space might be done using triangulation. Alternately, or additionally, a depth map might be computed for each frame which is then used to elevate the 20D points into 3D.

According to various embodiments, the 3D representation may be a 3D skeleton. For example, 20D skeleton detection may be performed on every frame using a machine learning procedure. As another example, 3D camera pose estimation may be performed to determine a location and angle of the camera with respect to the object for a particular frame. As yet another example, a 3D skeleton may be reconstructed from one or more 2D skeletons and/or one or more 3D models.

According to various embodiments, the 3D reconstruction of the object surface may include one or more of a variety of reconstruction procedures. For example, dominant axes may be computed to estimate orientation. As another example, an object model such as a vehicle model that has a reference orientation may be fit into a 3D reconstructed model based on the input data. As another example, one or more parts of a 3D reconstructed model may be classified to estimate an orientation of the object.

Estimated orientation for the object is determined at 2014. According to various embodiments, the estimated object orientation may be determined by a neural network. For example, a neural network may be trained to determine the estimated object orientation through an analysis of the object from one or more images of an object. The estimated object orientation may include estimates about an object's dominant axes, roll, elevation, angular position, attitude, and azimuth angle.

According to various embodiments, the object orientation may be estimated based on the sparse 3D mesh determined at operation 2010 and/or the 3D skeleton determined at operation 2012. For example, the fiducial points identified in operation 2008 facilitate the triangulation of fiducial points of the object in 3D space to help determine the azimuth, roll, elevation, and axes of the designated object. The 3D skeleton may facilitate the inference of the object's orientation based on cues such as, but not limited to, the surface normals of the faces of the mesh, and the visibility states of the fiducial points in the images of the object, and information about the three axes of the 3D skeleton model determined at operation 2012.

In some embodiments, the estimated object orientation may be determined based on a 3D reconstruction of the object. For example, the object orientation may be estimated based on the dominant axes of the 3D reconstruction of an object. As another example, the orientation for a designated object may be estimated by incorporating the orientation of a known reference object with reference orientation with a 3D reconstructed model of the designated object. As yet another example, parts of the 3D reconstructed model may be identified to determine orientation of the object. For example, in the case of a vehicle, the license plate may be identified as a reference point relative to the rearview mirror to estimate the orientation of the vehicle.

At 2016, the orientation estimation information is stored. In some implementations, the orientation estimation may be stored on a storage device. Alternately, or additionally, the orientation estimation may be transmitted to a remote location via a network.

According to various embodiments, the object orientation may be estimated based on the determination of specific reference points on the object. For example, in the case of a vehicle, a specific reference point such as the license plate may be detected in one or more images of a multi-view image set. Based on the location of the license plate in the image relative to other reference points, such as the vehicle's headlights, the orientation of the object may be inferred.

In some implementations, this determination may be performed on a 3D model of the object. For example, for a 3D model of a vehicle, the location of the license plate may be used to estimate global angle for the vehicle. Alternately, or additionally, the trajectory of a feature such as a license plate may be fit to an ellipse in image space, which corresponds to a sphere around the vehicle in 3D space, and the location on the ellipse is used to estimate the vehicle's orientation.

In some embodiments, the estimated object orientation may be determined from a single image. In some implementations, the object may not be visible from all angles or perspectives from a single image, or an image may not supply a minimum number of reference points visible to determine a sparse 3D mesh capable of facilitating the determination of a 3D skeleton of the object. In such situations, a neural network may be trained to predict coordinates of the visible object pixels in a top-down view of the object.

In particular embodiments, once the locations are mapped, the points may be lifted to 3D based on a predefined correspondence between the top-down view and a 3D mesh. Then, the transformation between the image points and the 3D mesh may be used to obtain the 3D orientation of the vehicle.

According to various embodiments, the estimated object orientation may be determined from a single image via top-down view mapping. For example, a network may be trained that takes an image of an object such as a vehicle as input and maps every point of the image onto a top-down view. Based on the distribution of the points on the top-down view, the system may then draw an inference about the orientation of the object with respect to the camera.

According to various embodiments, orientation may be estimated from a single image using a component classifier. For example, a network may be trained to identify object components such as car parts. For instance, each pixel of the image may be classified as belonging to an object component or as part of the background. The visible object components may then be used to estimate an orientation of the object.

According to various embodiments, the object orientation may be directly estimated from the detected 2D skeleton by considering which joints of the 2D skeleton are detected (i.e. are visible).

In some implementations, the estimated object orientation may be determined from a single image via using a neural network trained directly to determine an N degree-of-freedom pose. For example, a 3 degree-of-freedom pose may include azimuth, roll, and elevation. As another example, a 6 degree-of-freedom pose may include 3 degrees of freedom for orientation and 3 degrees of freedom for translation. As another example, a combination of 3 degrees of freedom for translation and 3 degrees of freedom for position may be used. For instance, a 2 degree-of-freedom pose may include 1 degree-of-freedom for orientation and 1 degree-of-freedom for the distance between the camera and the object.

In particular embodiments, any of the approaches involving a single image may be applied on a multi-view data set and the results combined (e.g., averaged) to improve the overall results. In general, any combination of the methods described herein may be used to increase robustness and/or provide a failsafe. For example, orientation may be independent estimated using three different methods, and then the results cross-checked.

Figure 22:
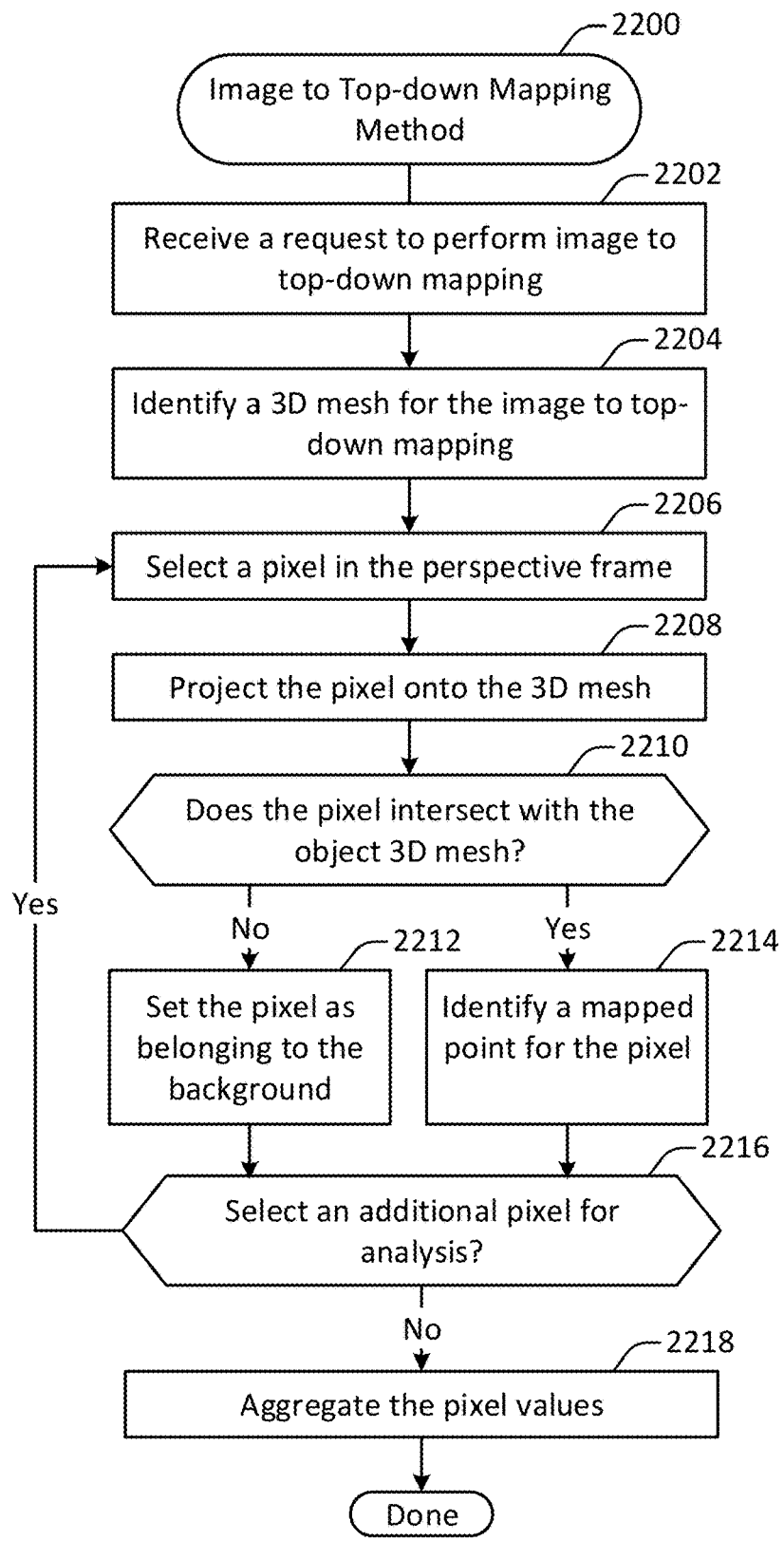
FIG. 22 illustrates one example of a method for performing perspective image to top-down view mapping, performed in accordance with one or more embodiments.

FIG. 22 illustrates one example of a method 2200 for performing perspective image to top-down view mapping, performed in accordance with one or more embodiments. In some embodiments, the method 2200 may be performed to map each pixel of an object represented in a perspective view to the corresponding point in a predefined top-down view of that class of objects.

The method 2200 may be performed on any suitable computing device. For example, the method 2200 may be performed on a mobile computing device such as a smart phone. Alternately, or additionally, the method 2200 may be performed on a remote server in communication with a mobile computing device.

A request to construct a top-down mapping of an object is received at 2202. According to various embodiments, the request may be generated after the performance of geometric analysis as discussed with respect to the method 500 shown in FIG. 5 The request may identify one or more images for which to perform the top-down mapping.

A 3D mesh for the image to top-down mapping is identified at 2204. The 3D mesh may provide a three-dimensional representation of the object and serve as an intervening representation between the actual perspective view image and the top-down view.

At 2206, a pixel in the perspective frame is selected for analysis. According to various embodiments, pixels may be selected in any suitable order. For example, pixels may be selected sequentially. As another example, pixels may be selected based on characteristics such as location or color. Such a selection process may facilitate faster analysis by focusing the analysis on portions of the image most likely to be present in the 3D mesh.

The pixel is projected onto the 3D mesh at 2208. In some implementations, projecting the pixel onto the 3D mesh may involve simulating a camera ray passing by the pixel position in the image plan and into the 3D mesh. Upon simulating such a camera ray, barycentric coordinates of the intersection point with respect to the vertices of the intersection face may be extracted.

A determination is made at 2210 as to whether the pixel intersects with the object 3D mesh. If the pixel does not intersect with the object 3D mesh, then at 2212 the pixel is set as belonging to the background. If instead the pixel does intersect with the object 3D mesh, then at 2214 a mapped point is identified for the pixel. According to various embodiments, a mapped point may be identified by applying the barycentric coordinates as weights for the vertices of the corresponding intersection face in the top-down image.

In some embodiments, a machine learning approach may be used to perform image to top-down mapping on a single image. For example, a machine learning algorithm such as deep net may be run on the perspective image as a whole. The machine learning algorithm may identify 2D locations of each pixel (or a subset of them) in the top-down image.

In some implementations, a machine learning approach may be used to perform top-down to image mapping. For example, given a perspective image and a point of interest in the top-down image, the machine learning algorithm may be run on the perspective image for identifying the top-down locations of its points. Then, the point of interest in the top-down image may be mapped to the perspective image.

In some embodiments, mapping the point of interest in the top-down image to the perspective image may involve first selecting the points in the perspective image whose top-down mapping is closest to the interest point. Then, the selected points in the perspective image may be interpolated.

Examples of an image to top-down mapping are shown in FIGS. 13, 14, and 15. The locations of pixels in images of vehicle components are represented by colored dots. These dot locations are mapped from fixed locations 1302 in the perspective view to corresponding locations 1304 on the top-down view 1306. FIG. 14 shows a similar arrangement, with fixed locations 1402 in the perspective view mapped to corresponding locations 1404 in the top-down view 1406. For example, in FIG. 13, the color coding corresponds to the location of the points in the image. A similar procedure may be performed in reverse to map from the top-down view to the perspective view.

In some implementations, a point of interest may be mapped as a weighted average of nearby points. For example, in FIG. 15, the mapping of any particular point, such as 1502, may depend on the value of nearby points, such as 1504 and 1506, drawn from the mapped location in perspective view.

Returning to FIG. 22, as an alternative to operations 2206-910, the projections of the 3D skeleton joints faces may be used together with the corresponding joints and faces in the top-down view to directly define image transformations that map pixel information from the perspective views into the top-down view and vice versa.

A determination is made at 2216 as to whether to select an additional pixel for analysis. According to various embodiments, analysis may continue until all pixels or a suitable number of pixels are mapped. As discussed with respect to operation 2206, pixels may be analyzed in sequence, in parallel, or in any suitable order.

Optionally, the computed pixel values are aggregated at 2218. According to various embodiments, aggregating the computing pixel values may involve, for example, storing a cohesive pixel map on a storage device or memory module.

According to various embodiments, one or more of the operations shown in FIG. 22 may be omitted. For example, a pixel may be ignored rather than setting it as a background pixel at 2212. In some implementations, one or more of the operations may be performed in an order different from that shown in FIG. 22. For example, pixel values may be aggregated cumulatively during pixel analysis. As another example, pixel values may be determined in parallel.

Figure 23:
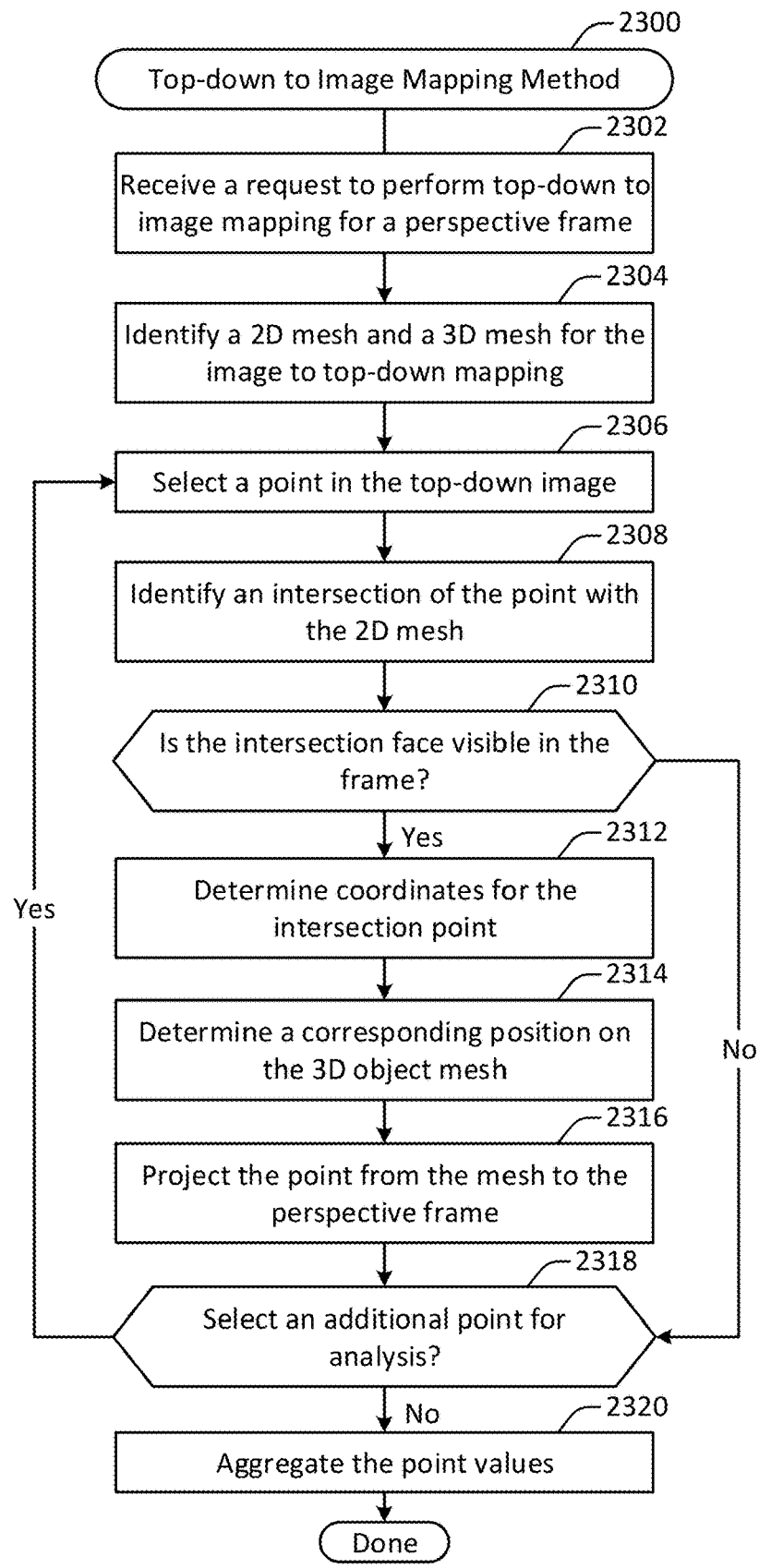
FIG. 23 illustrates one example of a method for performing top-down view to perspective image mapping, performed in accordance with one or more embodiments.

FIG. 23 illustrates one example of a method 2300 for performing top-down view to perspective image mapping, performed in accordance with one or more embodiments. According to various embodiments, top-down to image mapping refers to finding in a perspective image the position points from a top-down image.

The method 2300 may be performed on any suitable computing device. For example, the method 2300 may be performed on a mobile computing device such as a smart phone. Alternately, or additionally, the method 2300 may be performed on a remote server in communication with a mobile computing device.

At 2302, a request to perform top-down to image mapping is received for a perspective frame. At 2304, a 2D mesh and 3D mesh are identified. for the perspective image to top-down mapping. A 3D mesh is also referred to herein as a 3D skeleton.

At 2306, a point in the top-down image is selected for analysis. According to various embodiments, points may be selected in any suitable order. For example, points may be selected sequentially. As another example, points may be selected based on characteristics such as location. For example, points may be selected within a designated face before moving on to the next face of the top-down image.

At 2308, an intersection of the point with the 2D mesh is identified. A determination is then made at 2310 as to whether the intersection face is visible in the frame. According to various embodiments, the determination may be made in part by checking one or more visibility ranges determined in the preliminary step for the vertices of the intersection face. If the intersection face is not visible, then the point may be discarded.

If the intersection face is visible, then at 2312 coordinates for the intersection point are determined. According to various embodiments, determining coordinate points may involve, for example, extracting barycentric coordinates for the point with respect to the vertices of the intersection face.

A corresponding position on the 3D object mesh is determined at 2314. According to various embodiments, the position may be determined by applying the barycentric coordinates as weights for the vertices of the corresponding intersection face in the object 3D mesh.

The point is projected from the mesh to the perspective frame at 2316. In some implementations, projecting the point may involve evaluating the camera pose and/or the object 3D mesh for the frame. For example, the camera pose may be used to determine an angle and/or position of the camera to facilitate the point projection.

While the present disclosure has been particularly shown and described with reference to specific embodiments thereof, it will be understood by those skilled in the art that changes in the form and details of the disclosed embodiments may be made without departing from the spirit or scope of the invention. Specifically, there are many alternative ways of implementing the processes, systems, and apparatuses described. It is therefore intended that the invention be interpreted to include all variations and equivalents that fall within the true spirit and scope of the present invention.

The invention claimed is:

1. A method comprising:
   determining a respective mapping between each of a plurality of viewpoints of an object and an object model representing the object, each mapping identifying a location on the object model corresponding with a portion of the object captured in the respective viewpoint;
   creating a plurality of tags for the object model based on the mappings, each tag linking one or more of the viewpoints to a respective one of the locations on the object model; and
   providing for presentation on a display screen a user interface that includes the object model and the tags, the user interface presenting a designated one of the plurality of viewpoints when a designated tag corresponding with the designated viewpoint is selected in the object model.

2. The method recited in claim 1, wherein the designated tag is mapped to a set of the viewpoints including the designated viewpoint, and wherein each of the set of viewpoints is presented when the designated viewpoint is selected.

3. The method recited in claim 1, wherein determining the respective mapping comprises estimating a pose of a camera associated with the respective viewpoint with respect to the object model.

4. The method recited in claim 1, wherein determining the respective mapping comprises determining a dense pixel mapping between the respective viewpoint and the object model.

5. The method recited in claim 1, wherein determining the respective mapping comprises identifying an object component represented in the respective viewpoint.

6. The method recited in claim 1, the method further comprising:
determining whether a designated object component is represented in the plurality of viewpoints; and
when it is determined that the designated object component is not represented in the plurality of viewpoints, providing recording guidance via a user interface at a computing device to facilitate the capture of the designated object component in an additional viewpoint of the object.

7. The method recited in claim 6, wherein the recording guidance is provided via an overlay presented on a live camera feed at a smartphone.

8. The method recited in claim 1, wherein a designated one of the plurality of viewpoints is a frame selected from a video file generated by moving a camera in an arc around the object.

9. The method recited in claim 1, wherein a designated one of the plurality of viewpoints is a perspective view image selected from a set of perspective view images captured as a camera was moved in an arc around the object.

10. The method recited in claim 1, wherein a designated one of the plurality of viewpoints is a perspective view selected from a multi-view representation of the object.

11. The method recited in claim 10, wherein the multi-view representation of the object is generated on a mobile computing device comprising a camera, and wherein each of the plurality of images of the object are captured by the camera.

12. The method recited in claim 10, wherein the multi-view representation includes a 3D model of the object determined based on analyzing the first plurality of images.

13. The method recited in claim 10, wherein viewpoints are captured at a mobile computing device that includes an inertial measurement unit configured to capture inertial measurement data, and wherein determining the respective mapping involves analyzing the inertial measurement data.

14. The method recited in claim 1, wherein the object is a vehicle, and wherein the plurality of viewpoints represent perspective views captured as a camera pans around the vehicle, and wherein the object model includes a top-down view of the vehicle.

15. The method recited in claim 1, wherein determining the respective mapping comprises applying a neural network to one or more of the viewpoints.

16. The method recited in claim 1, the method further comprising:
comparing the viewpoints with reference visual data to identify damage to the object; and
representing the damage on the object model in the user interface.

17. A computing device comprising:
a processor configured to:
determine a respective mapping between each of a plurality of viewpoints of an object and an object model representing the object, each mapping identifying a location on the object model corresponding with a portion of the object captured in the respective viewpoint, and
create a plurality of tags for the object model based on the mappings, each tag linking one or more of the viewpoints to a respective one of the locations on the object model; and
a display screen configured to provide a user interface that includes the object model and the tags, the user interface presenting a designated one of the plurality of viewpoints when a designated tag corresponding with the designated viewpoint is selected in the object model.

18. The computing device recited in claim 17, wherein the designated tag is mapped to a set of the viewpoints including the designated viewpoint, and wherein each of the set of viewpoints is presented when the designated viewpoint is selected.

19. The computing device recited in claim 17, wherein determining the respective mapping comprises estimating a pose of a camera associated with the respective viewpoint with respect to the object model.

20. One or more non-transitory machine-readable media having instructions stored thereon for performing a method, the method comprising:
determining a respective mapping between each of a plurality of viewpoints of an object and an object model representing the object, each mapping identifying a location on the object model corresponding with a portion of the object captured in the respective viewpoint;
creating a plurality of tags for the object model based on the mappings, each tag linking one or more of the viewpoints to a respective one of the locations on the object model; and
providing for presentation on a display screen a user interface that includes the object model and the tags, the user interface presenting a designated one of the plurality of viewpoints when a designated take corresponding with the designated viewpoint is selected in the object model.

* * * * *